United States Patent
Hunt

(10) Patent No.: US 10,507,845 B2
(45) Date of Patent: Dec. 17, 2019

(54) METHOD AND APPARATUS FOR CHANGING VEHICLE BEHAVIOR BASED ON CURRENT VEHICLE LOCATION AND ZONE DEFINITIONS CREATED BY A REMOTE USER

(71) Applicant: ZONAR SYSTEMS, INC., Seattle, WA (US)

(72) Inventor: Bryan Hunt, Spokane, WA (US)

(73) Assignee: ZONAR SYSTEMS, INC., Seattle, WA (US)

(*) Notice: Subject to any disclaimer, the term of this patent is extended or adjusted under 35 U.S.C. 154(b) by 312 days.

(21) Appl. No.: 15/355,423

(22) Filed: Nov. 18, 2016

(65) Prior Publication Data

US 2017/0066453 A1 Mar. 9, 2017

Related U.S. Application Data

(63) Continuation of application No. 15/005,746, filed on Jan. 25, 2016, now Pat. No. 9,527,515, which is a
(Continued)

(51) Int. Cl.
*B60W 50/14* (2012.01)
*B60W 40/09* (2012.01)
(Continued)

(52) U.S. Cl.
CPC .......... *B60W 50/14* (2013.01); *B60W 30/143* (2013.01); *B60W 40/09* (2013.01);
(Continued)

(58) Field of Classification Search
CPC ........... B60W 2550/402; B60W 40/09; B60W 50/14; G09B 19/167; G09B 9/052; G09B 19/16
See application file for complete search history.

(56) References Cited

U.S. PATENT DOCUMENTS 3,990,067 A  11/1976  Van Dusen et al.
4,025,791 A  5/1977  Lennington et al.
(Continued)

FOREIGN PATENT DOCUMENTS

CA  2138378  11/1994
CA  2326892  10/1999
(Continued)

OTHER PUBLICATIONS

"The PenMaster" and "The PSION Workabout." Copyright 2000 GCS General Control Systems. <http://www.gcs.at/eng/produkte/hw/penmaster.htm>.
(Continued)

*Primary Examiner* — Jerry-Daryl Fletcher

(57) ABSTRACT

A remote user can define one or more zone based driver/vehicle behavior definitions. Current vehicle location is analyzed at the vehicle or remotely to determine if the vehicle is approaching or has arrived at a location for which a zone based driver/vehicle behavior has been defined. For zone based driver behavior definitions, a display in the vehicle automatically displays the zone based driver behavior definition to the driver. In some embodiments driver compliance is tracked and non-compliance is reported to the remote user. For zone based vehicle behavior definitions, a vehicle controller at the vehicle responsible for controlling the defined behavior is reprogrammed to impose the defined behavior (no regeneration at location, max speed at location, no idle over 2 minutes at location, etc.). Once the vehicle has left the zone, the controller programming reverts to its prior state, and/or zone based driver behavior definition is no longer displayed.

20 Claims, 10 Drawing Sheets

Related U.S. Application Data continuation-in-part of application No. 14/214,008, filed on Mar. 14, 2014, now Pat. No. 10,056,008, which is a continuation-in-part of application No. 14/206,760, filed on Mar. 12, 2014, now Pat. No. 9,358,986, and a continuation-in-part of application No. 13/857,982, filed on Apr. 5, 2013, now Pat. No. 9,747,254, and a continuation-in-part of application No. 13/854,919, filed on Apr. 1, 2013, now Pat. No. 8,914,184, which is a continuation-in-part of application No. 13/725,128, filed on Dec. 21, 2012, now Pat. No. 9,412,282, and a continuation-in-part of application No. 13/725,266, filed on Dec. 21, 2012, now Pat. No. 9,489,280, and a continuation-in-part of application No. 13/725,886, filed on Dec. 21, 2012, now abandoned, and a continuation-in-part of application No. 13/725,183, filed on Dec. 21, 2012, now Pat. No. 9,170,913, and a continuation-in-part of application No. 13/719,211, filed on Dec. 18, 2012, now abandoned, and a continuation-in-part of application No. 13/719,208, filed on Dec. 18, 2012, now Pat. No. 9,384,111, and a continuation-in-part of application No. 13/719,218, filed on Dec. 18, 2012, now Pat. No. 9,280,435.

(60) Provisional application No. 61/800,726, filed on Mar. 15, 2013, provisional application No. 61/801,725, filed on Mar. 15, 2013, provisional application No. 61/802,191, filed on Mar. 15, 2013, provisional application No. 61/801,082, filed on Mar. 15, 2013, provisional application No. 61/621,456, filed on Apr. 6, 2012, provisional application No. 61/618,827, filed on Apr. 1, 2012, provisional application No. 61/580,197, filed on Dec. 24, 2011, provisional application No. 61/580,190, filed on Dec. 23, 2011.

(51) Int. Cl.
  *B60W 30/14* (2006.01)
  *F01N 9/00* (2006.01)
  *F02D 41/02* (2006.01)
  *G01C 21/26* (2006.01)

(52) U.S. Cl.
  CPC ............ *F01N 9/002* (2013.01); *F02D 41/029* (2013.01); *B60W 2510/0638* (2013.01); *B60W 2510/0657* (2013.01); *B60W 2520/10* (2013.01); *B60W 2530/10* (2013.01); *B60W 2540/28* (2013.01); *B60W 2550/142* (2013.01); *B60W 2550/143* (2013.01); *B60W 2550/402* (2013.01); *B60W 2550/404* (2013.01); *B60W 2710/0644* (2013.01); *B60W 2710/10* (2013.01); *B60W 2710/30* (2013.01); *B60W 2750/40* (2013.01); *F02D 2200/701* (2013.01); *G01C 21/26* (2013.01)

(56) References Cited

U.S. PATENT DOCUMENTS

| | | |
|---|---|---|
| 4,258,521 A | 3/1981 | Juhasz et al. |
| 4,325,057 A | 4/1982 | Bishop |
| 4,602,127 A | 7/1986 | Neely et al. |
| 4,688,244 A | 8/1987 | Hannon et al. |
| 4,750,197 A | 7/1988 | Denekamp et al. |
| 4,763,356 A | 8/1988 | Day, Jr. et al. |
| 4,799,162 A | 1/1989 | Shinakawa et al. |
| 4,897,792 A | 1/1990 | Hosoi |
| 5,058,044 A | 10/1991 | Stewart et al. |
| 5,068,656 A | 11/1991 | Sutherland |
| 5,128,651 A | 7/1992 | Heckart |
| 5,206,643 A | 4/1993 | Eckelt |
| 5,223,844 A | 6/1993 | Mansell et al. |
| 5,243,343 A | 9/1993 | Rogers |
| 5,321,629 A | 6/1994 | Shirata et al. |
| 5,394,136 A | 2/1995 | Lammers et al. |
| 5,399,844 A | 3/1995 | Holland |
| 5,459,304 A | 10/1995 | Eisenmann |
| 5,459,660 A | 10/1995 | Berra |
| 5,499,182 A | 3/1996 | Ousborne |
| 5,541,845 A | 7/1996 | Klein |
| 5,546,305 A | 8/1996 | Kondo |
| 5,557,254 A | 9/1996 | Johnson et al. |
| 5,557,628 A | 9/1996 | Hughes et al. |
| 5,572,192 A | 11/1996 | Berube |
| 5,585,552 A | 12/1996 | Heuston et al. |
| 5,600,323 A | 2/1997 | Boschini |
| 5,610,596 A | 3/1997 | Petitclerc |
| 5,629,678 A | 5/1997 | Gargano et al. |
| 5,671,158 A | 9/1997 | Fournier et al. |
| 5,680,328 A | 10/1997 | Skorupski et al. |
| 5,711,712 A | 1/1998 | Graf |
| 5,719,771 A | 2/1998 | Buck et al. |
| 5,731,893 A | 3/1998 | Dominique |
| 5,754,965 A | 5/1998 | Hagenbuch |
| 5,758,299 A | 5/1998 | Sandborg et al. |
| 5,768,382 A | 6/1998 | Schneier et al. |
| 5,804,937 A | 9/1998 | Sasajima et al. |
| 5,808,565 A | 9/1998 | Matta et al. |
| 5,839,112 A | 11/1998 | Schreitmueller et al. |
| 5,874,891 A | 2/1999 | Lowe |
| 5,942,753 A | 8/1999 | Dell |
| 5,983,154 A | 11/1999 | Morisawa |
| 5,995,895 A | 11/1999 | Watt et al. |
| 5,995,898 A | 11/1999 | Tuttle |
| 6,043,661 A | 3/2000 | Gutierez |
| 6,049,755 A | 4/2000 | Lou et al. |
| 6,054,950 A | 4/2000 | Fontana |
| 6,070,118 A | 5/2000 | Ohta |
| 6,078,255 A | 6/2000 | Dividock et al. |
| 6,092,021 A | 7/2000 | Ehlbeck et al. |
| 6,107,915 A | 8/2000 | Reavell et al. |
| 6,107,917 A | 8/2000 | Carrender et al. |
| 6,128,959 A | 10/2000 | McGovern et al. |
| 6,134,499 A | 10/2000 | Goode et al. |
| 6,169,943 B1 | 1/2001 | Simon et al. |
| 6,236,911 B1 | 5/2001 | Kruger |
| 6,253,129 B1 | 6/2001 | Jenkins |
| 6,256,579 B1 | 7/2001 | Tanimoto |
| 6,263,273 B1 | 7/2001 | Henneken et al. |
| 6,278,928 B1 | 8/2001 | Aruga et al. |
| 6,370,454 B1 | 4/2002 | Moore |
| 6,374,176 B1 | 4/2002 | Schmier et al. |
| 6,396,413 B2 | 5/2002 | Hines et al. |
| 6,411,891 B1 | 6/2002 | Schick et al. |
| 6,421,790 B1 | 7/2002 | Fruehling et al. |
| 6,438,472 B1 | 8/2002 | Tano et al. |
| 6,450,411 B1 | 9/2002 | Rash et al. |
| 6,456,039 B1 | 9/2002 | Lauper et al. |
| 6,505,106 B1 | 1/2003 | Lawrence |
| 6,529,808 B1 | 3/2003 | Diem |
| 6,539,296 B2 | 3/2003 | Diaz et al. |
| 6,594,621 B1 | 6/2003 | Meeker |
| 6,597,973 B1 | 7/2003 | Barich et al. |
| 6,614,392 B2 | 9/2003 | Howard |
| 6,664,897 B2 | 12/2003 | Pape et al. |
| 6,671,646 B2 | 12/2003 | Manegold et al. |
| 6,708,113 B1 | 3/2004 | Von Gerlach et al. |
| 6,735,542 B1 | 5/2004 | Burgett et al. |
| 6,757,606 B1 | 6/2004 | Gonring |
| 6,795,761 B1 | 9/2004 | Lee et al. |
| 6,801,901 B1 | 10/2004 | Ng |
| 6,804,626 B2 | 10/2004 | Manegold et al. |
| 6,834,259 B1 | 12/2004 | Markwitz et al. |
| 6,847,887 B1 | 1/2005 | Casino |
| 6,856,897 B1 | 2/2005 | Phuyal |
| 6,894,617 B2 | 5/2005 | Richman |
| 6,909,947 B2 | 7/2005 | Douros et al. |
| 7,027,955 B2 | 4/2006 | Markwitz et al. |

(56) References Cited

U.S. PATENT DOCUMENTS

| | | |
|---|---|---|
| 7,035,733 B1 | 4/2006 | Alwar et al. |
| 7,048,185 B2 | 5/2006 | Hart et al. |
| 7,103,460 B1 | 9/2006 | Breed |
| 7,129,852 B2 | 10/2006 | Aslund et al. |
| 7,174,243 B1 | 2/2007 | Lightner et al. |
| 7,174,277 B2 | 2/2007 | Vock et al. |
| 7,177,750 B2 | 2/2007 | Schroder |
| 7,184,866 B2 | 2/2007 | Squires et al. |
| 7,254,516 B2 | 8/2007 | Case, Jr. et al. |
| 7,424,414 B2 | 9/2008 | Craft |
| 7,590,768 B2 | 9/2009 | Gormley |
| 7,660,658 B2 | 2/2010 | Shyenblat |
| 7,692,552 B2 | 4/2010 | Harrington et al. |
| 7,774,123 B2 | 8/2010 | Schroder |
| 7,831,368 B2 | 11/2010 | Schroder |
| 7,925,426 B2 | 4/2011 | Koebler et al. |
| 8,046,501 B2 | 10/2011 | Gormley |
| 8,140,265 B2 | 3/2012 | Grush |
| 8,185,293 B2 | 5/2012 | Jiang et al. |
| 8,204,634 B2 | 6/2012 | Schwarz et al. |
| 8,219,796 B2 | 7/2012 | Weiberle et al. |
| 8,280,573 B2 | 10/2012 | Suduo et al. |
| 8,560,996 B1 | 10/2013 | Brebner et al. |
| 8,577,703 B2 | 11/2013 | McClellan et al. |
| 8,604,920 B2 | 12/2013 | Armitage et al. |
| 8,849,501 B2 | 9/2014 | Cook et al. |
| 8,918,229 B2 | 12/2014 | Hunt |
| 8,930,040 B2 | 1/2015 | Gompert et al. |
| 8,996,287 B2 | 3/2015 | Davidson et al. |
| 9,170,913 B2 | 10/2015 | Hunt |
| 2001/0047283 A1 | 11/2001 | Melick et al. |
| 2001/0053983 A1 | 12/2001 | Reichwein et al. |
| 2002/0016655 A1 | 2/2002 | Joao |
| 2002/0022979 A1 | 2/2002 | Whipp et al. |
| 2002/0022984 A1 | 2/2002 | Daniel et al. |
| 2002/0065698 A1 | 5/2002 | Schick et al. |
| 2002/0107833 A1 | 8/2002 | Kerkinni |
| 2002/0107873 A1 | 8/2002 | Winkler et al. |
| 2002/0111725 A1 | 8/2002 | Burge |
| 2002/0116122 A1 | 8/2002 | Satonaka |
| 2002/0122583 A1 | 9/2002 | Thompson |
| 2002/0133273 A1 | 9/2002 | Lowrey et al. |
| 2002/0133275 A1 | 9/2002 | Thibault |
| 2002/0147610 A1 | 10/2002 | Tabe |
| 2002/0150050 A1 | 10/2002 | Nathanson |
| 2002/0156558 A1 | 10/2002 | Hanson et al. |
| 2002/0163449 A1 | 11/2002 | Flick |
| 2002/0165669 A1 | 11/2002 | Pinto et al. |
| 2002/0178147 A1 | 11/2002 | Arroyo et al. |
| 2002/0188593 A1 | 12/2002 | Moser et al. |
| 2003/0030550 A1 | 2/2003 | Talbot |
| 2003/0033061 A1 | 2/2003 | Chen et al. |
| 2003/0033071 A1 | 2/2003 | Kawasaki |
| 2003/0036823 A1 | 2/2003 | Mahvi |
| 2003/0060966 A1 | 3/2003 | MacPhail et al. |
| 2003/0109973 A1 | 6/2003 | Hensey et al. |
| 2003/0120745 A1 | 6/2003 | Katagishi et al. |
| 2003/0182033 A1 | 9/2003 | Underdahl |
| 2003/0210129 A1 | 11/2003 | Aslund et al. |
| 2003/0216847 A1 | 11/2003 | Bellinger |
| 2004/0009819 A1 | 1/2004 | Koga |
| 2004/0054470 A1 | 3/2004 | Farine et al. |
| 2004/0236596 A1 | 11/2004 | Chowdhary et al. |
| 2004/0243368 A1 | 12/2004 | Hierner et al. |
| 2005/0021222 A1 | 1/2005 | Minami et al. |
| 2005/0107946 A1 | 5/2005 | Shimizu |
| 2005/0209775 A1 | 9/2005 | Entenmann |
| 2005/0273250 A1 | 12/2005 | Hamilton et al. |
| 2006/0246918 A1 | 11/2006 | Fok et al. |
| 2007/0001831 A1 | 1/2007 | Raz et al. |
| 2007/0083314 A1 | 4/2007 | Corigliano |
| 2007/0143002 A1 | 6/2007 | Crowell et al. |
| 2007/0156337 A1 | 7/2007 | Yanni |
| 2007/0168125 A1 | 7/2007 | Petrik |
| 2007/0174683 A1 | 7/2007 | Gehring et al. |
| 2007/0179709 A1 | 8/2007 | Doyle |
| 2007/0192012 A1 | 8/2007 | Letang |
| 2007/0198160 A1 | 8/2007 | Sheynblat |
| 2007/0256481 A1 | 11/2007 | Nishiyama et al. |
| 2008/0027591 A1 | 1/2008 | Lenser et al. |
| 2008/0086241 A1 | 4/2008 | Phillips et al. |
| 2008/0109122 A1 | 5/2008 | Ferguson et al. |
| 2008/0121443 A1 | 5/2008 | Clark et al. |
| 2008/0125965 A1* | 5/2008 | Carani ............... G07C 5/008 701/408 |
| 2008/0154489 A1 | 6/2008 | Kaneda et al. |
| 2008/0154691 A1* | 6/2008 | Wellman ............ G05D 1/0282 705/7.26 |
| 2008/0154712 A1 | 6/2008 | Wellman |
| 2008/0167767 A1 | 7/2008 | Brooks et al. |
| 2008/0243389 A1 | 10/2008 | Inoue |
| 2008/0262646 A1 | 10/2008 | Breed |
| 2008/0269974 A1 | 10/2008 | Schwarz et al. |
| 2008/0319602 A1 | 12/2008 | McClellan et al. |
| 2009/0037033 A1 | 2/2009 | Phillips et al. |
| 2009/0140886 A1* | 6/2009 | Bender ................ B60R 25/00 340/988 |
| 2009/0143923 A1 | 6/2009 | Breed |
| 2009/0156310 A1 | 6/2009 | Fargo |
| 2009/0157267 A1 | 6/2009 | Shin et al. |
| 2009/0160675 A1 | 6/2009 | Piccini et al. |
| 2009/0186325 A1 | 6/2009 | Kumar |
| 2009/0240391 A1 | 9/2009 | Duddle et al. |
| 2009/0254259 A1 | 10/2009 | The |
| 2009/0299562 A1 | 12/2009 | Suduo et al. |
| 2010/0009696 A1 | 1/2010 | Fok et al. |
| 2010/0070153 A1* | 3/2010 | Bradley ............ B60W 50/0098 701/103 |
| 2010/0114404 A1 | 5/2010 | Donnelly |
| 2010/0145550 A1 | 6/2010 | Ross-Martin |
| 2010/0145600 A1 | 6/2010 | Son et al. |
| 2010/0152941 A1 | 6/2010 | Skaff et al. |
| 2010/0160013 A1 | 6/2010 | Sanders |
| 2010/0191403 A1 | 7/2010 | Krause |
| 2010/0204882 A1 | 8/2010 | Giovaresco et al. |
| 2010/0209884 A1 | 8/2010 | Lin et al. |
| 2010/0209890 A1 | 8/2010 | Huang et al. |
| 2010/0209891 A1 | 8/2010 | Lin et al. |
| 2010/0211278 A1 | 8/2010 | Craig |
| 2010/0305819 A1 | 12/2010 | Pihalajamaki |
| 2011/0040579 A1* | 2/2011 | Havens ............... G06Q 10/08 705/4 |
| 2011/0098898 A1 | 4/2011 | Stahlin et al. |
| 2011/0106388 A1 | 5/2011 | Boeckenhoff |
| 2011/0112739 A1 | 5/2011 | O'Dea |
| 2011/0148618 A1 | 6/2011 | Harumoto et al. |
| 2011/0161116 A1 | 6/2011 | Peak et al. |
| 2011/0276209 A1 | 11/2011 | Suganuma |
| 2011/0279255 A1 | 11/2011 | Miyoshi |
| 2011/0313647 A1 | 12/2011 | Koebler et al. |
| 2012/0028635 A1* | 2/2012 | Borg .................. G06Q 10/06 455/423 |
| 2012/0083958 A1 | 4/2012 | Ballard |
| 2012/0143484 A1 | 6/2012 | Sawada |
| 2012/0191269 A1 | 7/2012 | Chen et al. |
| 2012/0221216 A1 | 8/2012 | Chauncey et al. |
| 2012/0221234 A1 | 8/2012 | Sujan et al. |
| 2012/0226390 A1* | 9/2012 | Adams ............... G07C 5/008 701/1 |
| 2012/0256770 A1 | 10/2012 | Mitchell |
| 2012/0268587 A1 | 10/2012 | Robbins et al. |
| 2013/0006469 A1 | 1/2013 | Green et al. |
| 2013/0046559 A1 | 2/2013 | Coleman et al. |
| 2013/0061044 A1 | 3/2013 | Pinkus et al. |
| 2013/0158838 A1 | 6/2013 | Yorke et al. |
| 2013/0164712 A1 | 6/2013 | Hunt et al. |
| 2013/0164713 A1 | 6/2013 | Hunt et al. |
| 2013/0164715 A1 | 6/2013 | Hunt et al. |
| 2013/0166170 A1 | 6/2013 | Hunt et al. |
| 2013/0184965 A1 | 7/2013 | Hunt et al. |
| 2013/0209968 A1 | 8/2013 | Miller |
| 2013/0238182 A1 | 9/2013 | Osagawa et al. |
| 2013/0274955 A1 | 10/2013 | Rosenbaum |
| 2013/0345927 A1 | 12/2013 | Cook et al. |

(56) References Cited

U.S. PATENT DOCUMENTS

| | | | |
|---|---|---|---|
| 2014/0195106 A1 | 7/2014 | McQuade et al. |
| 2014/0257943 A1 | 9/2014 | Nerayoff et al. |
| 2014/0309849 A1 | 10/2014 | Ricci |
| 2014/0350777 A1 | 11/2014 | Kawai et al. |
| 2014/0365070 A1 | 12/2014 | Yano et al. |
| 2015/0291176 A1 | 10/2015 | Jeong |

FOREIGN PATENT DOCUMENTS

| | | |
|---|---|---|
| CA | 2388572 T1 | 5/2001 |
| EP | 2116968 A1 | 11/2009 |
| JP | 280985 A | 10/2001 |
| JP | 2001280985 A | 10/2001 |
| WO | 023550 | 3/2003 |

OTHER PUBLICATIONS

Tiscor: Inspection Manager 6.0 User Guide. USA; 2004. 1-73.

"D. 0. T. Driver Vehicle Inspection Reports on your wireless phone!" FleeTTrakkeR LLC 2002-2003 FleeTTrakkeR LLC . All rights reserved <http://www.fleettrakker.com/web/index.jsp>.

"Detex Announces the Latest Innovation in Guard Tour Verification Technology." DETEX Life Safety, Security and Security Assurance. Jan. 1, 2003. 1pp. © 2002-2004 Detex Corporation. <http://www.detex.com/NewsAction.jspa?id=3>.

"Nextel, Motorola and Symbol Technologies Offer First Wireless Bar Code Scanner for Mobile Phones." InvoiceDealers.

"The Data Acquisition Unit Escorte." The Proxi Escort.com. Nov. 20, 2001. 4pp. © 2000 GCS General Control Systems. <http://www.gcs.at/eng/produkte/hw/escone.htm>.

"Tracking out of route: software helps fleets compare planned routes to actual miles. (Technology)." Commercial Carrier Journal. Published Oct. 1, 2005. 4pp. NDN-219-1054-1717-0.

"What is the Child Check-Mate Safety System?" 2002@Child Checkmate Systems, Inc. <http://www.childcheckmate.comlwhat.html>.

Albright, Brian: "Indiana Embarks on Ambitious RFID roll out." Frontline Solutions. May 20, 2002; 2pp. Available at: <http://www.frontlinetoday.comlfrontline/article/articleDetail.jsp?id=19358>.

Anonymous. "Transit agency builds GIS to plan bus routes." American City & County. vol. 118, No. 4. Publlished Apr. 1, 2003. 4pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

Dwyer, B.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Government: A Story Behind It's Ranking." INCONTEXT Indiana;s Workforce and Economy. Jan.-Feb. 2003 vol. 4, No. 5pp. Available at <http://www.incontext.indiana.edu/2003/janfeb03/governement.html>.

Quaan et al., "Guard Tour Systems." Security Management Online. Sep. 16, 2003. 1pg. © 2000 Available at: <http://www.securitymanagement.comiubb/Forum30/HTMLI000066.html>.

Qualcomm. "Object FX Integrates TrackingAdvisor with Qualcomm's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving a Niche Beyond Asset Tracking." Business Solutions. Feb. 1999: 5pp. Available at: <http://www.businesssolutionsmag.com/Articles/1999_02/990208.html>.

Tiscor: The Mobile Software Solutions Provider. Inspection Manager: An Introduction and Slide Presentation; 19pp. Available: <www/TOSCOR.com>.

Tsakiri, M et al. Abstract: "Urban fleet monitoring with GPS and GLONASS." Journal ofNavigation, vol. 51, No. 3. Published Sep. 1998. 2pp. NDN-174-0609-4097-3.

Tuttle, John R. "Digital RF/ID Enhances GPS" Proceedings of the Second Annual Wireless Symposium, pp. 406-411, Feb. 15-18, 1994, Santa Clara, CA.

Want, Roy, "RFID A Key to Automating Everything." Scientific American (Jan. 2004): 58-65.

\* cited by examiner

Analysis done on "Cloud" servers

- transRatio = (60*RPM)/(Rear Axle Ratio * Tire Revolutions Per Mile * MPH)
  - RPM = Vehicle Revolutions Per Minute pulled from vehicle ECM
  - MPH = Vehicle Miles Per Hour pulled from vehicle ECM
  - RPM * 60 = Revolution Per Hour (RPH)
  - Rear Axle Ratio = Customer will have to supply this Ratio per vehicle
  - Tire Revolutions Per Mile = Customer must provide, part of tire specs
- Example 1 transRatio = 0.801 = (60*1350)/(3.55*518*55)
  - Vehicle at 1350 RPM and 55 MPH
- Example 2 transRatio = 0.627 = (60*1250)/(3.55*518*65)
  - Vehicle at 1250 RPM and 65 MPH
- TransRatio is compared with customer provided transmission ratios
  - Example Gear Ratio Table Below

| gear position | transmission ratio |
|---|---|
| L | 12.31 |
| 1 | 8.64 |
| 2 | 6.11 |
| 3 | 4.43 |
| 4 | 3.23 |
| 5 | 2.39 |
| 6 | 1.93 |
| 7 | 1.62 |
| 8 | 1.38 |
| 9 | 1.17 |
| 10 | 1.00 |
| 11 | 0.86 |
| 12 | 0.73 |

- Example 1 transRatio = .801 = Gear 11 (1350 RPM, 55 MPH)
  - Example 2 transRatio = .627 = Gear 12 (1250 RPM, 65 MPH)
- Distance Travelled between GPS points (odometer delta) while vehicle is in top gear is recorded as top gear distance
- Top Gear % = Top Gear Distance / Total Distance travelled Information Presented to user in a web user interface

- Show map of vehicle path (GPS points)
- Display % travelled in top Gear
- Area in Top Gear colored Red
- Area travelled in lower gear colored blue

FIG. 13B

METHOD AND APPARATUS FOR CHANGING VEHICLE BEHAVIOR BASED ON CURRENT VEHICLE LOCATION AND ZONE DEFINITIONS CREATED BY A REMOTE USER

RELATED APPLICATIONS

This application is a continuation of application Ser. No. 15/005,746 filed Jan. 25, 2016, which is incorporated by reference as if fully set forth herein and which in itself is a continuation-in-part of application Ser. No. 14/214,008 filed Mar. 14, 2014, which is also incorporated by reference as if fully set forth herein and which is based on two prior provisional applications, Ser. No. 61/800,726 and Ser. No. 61/802,191, each filed on Mar. 15, 2013, and which is a continuation-in-part of application Ser. No. 14/206,760 filed Mar. 12, 2014, now U.S. Pat. No. 9,358,986 issued Jun. 7, 2016, and which is a continuation-in-part of application Ser. No. 13/857,982 filed Apr. 5, 2013 and Ser. No. 13/854,919 filed Apr. 1, 2013, now U.S. Pat. No. 8,914,184 issued Dec. 16, 2014, and which claims priority from provisional application Ser. No. 61/800,726, Ser. No. 61/801,082, Ser. No. 61/801,725 each filed Mar. 15, 2013 and Ser. No. 61/621,456 filed Apr. 6, 2012 and Ser. No. 61/618,827 filed Apr. 1, 2012, and which is a continuation-in-part of two prior application Ser. No. 13/725,128, now U.S. Pat. No. 9,412,282 issued on Aug. 9, 2016, and Ser. No. 13/725,886, both of which were filed on Dec. 21, 2012, and each of which is based on prior provisional application; Ser. No. 61/580,197, filed on Dec. 24, 2011, and which is continuation-in-part of the following prior applications: Ser. No. 13/719,208, now U.S. Pat. No. 9,384,111 issued on Jul. 5, 2016; Ser. No. 13/719,211; and Ser. No. 13/719,218, now U.S. Pat. No. 9,280,435 issued on Mar. 8, 2016, each of which were filed on Dec. 18, 2012, and each of which is based on prior provisional application; Ser. No. 61/580,190, filed on Dec. 23, 2011, and which is a continuation-in-part of the following applications: Ser. No. 13/725,183, now U.S. Pat. No. 9,170,913 issued on Oct. 27, 2015 and Ser. No. 13/725,266, now U.S. Pat. No. 9,489,280 issued on Nov. 8, 2016, each of which were filed on Dec. 21, 2012, and each of which is based on prior provisional application; Ser. No. 61/580,190, filed on Dec. 23, 2011, all which are incorporated herein by reference as if fully set forth herein.

BACKGROUND

Modern vehicles are often equipped with sophisticated controllers that enable vehicle performance characteristics to be optimized for specific needs. An engine manufacturer may use different programming logic to vary the engine performance characteristics, including horsepower delivered, according to the needs of a specific customer or class of customers. For example, trucks sold for use in over the road trucking, operating for most of their service life on highways; require different performance characteristics than similar trucks operating for most of their service life on city streets in stop and go traffic. A fuel map refers to a set of programming instructions that can be input into an engine control unit (an ECU) to modify performance characteristics of an engine.

As used herein and in the claims that follow, the term fuel map refers to a specific program (i.e., a set of machine instructions) used by an engine control unit (an ECU) to determine how to respond to various sensor inputs (i.e., changes in driving conditions). The ECU generally responds to changing inputs by changing at least one of the following parameters: fuel flow rate, spark timing, and idle speed. Changing the fuel map (i.e., the instruction set used by the ECU) will change the performance characteristics of the engine. Manufacturers generally select a fuel map to provide satisfactory vehicle performance over a wide range of conditions.

Other ECU programming instructions sets can be used to modify other performance characteristics, such as maximum road speed, maximum RMP, maximum idle time, etc.

In general, modification of such programming instructions sets requires a replacement instruction set, a hardware interface to be coupled to a vehicle data port (enabling the instruction set to be sent to the appropriate ECU), and a software interface or software application to manage the replacement. Some third party vendors sells kits enabling vehicle owners to perform their own ECU reprogramming using a laptop and a custom hardware interface, programming set, and software application (generally the hardware interface, programming set, and software application are sold together as a kit). Otherwise, vehicle operators need to bring their vehicle to a mechanic to have such ECU reprogramming performed.

It would be desirable to provide vehicle operators with the ability to more readily implement ECU reprogramming. Fuel mapping and other performance related instructions set, customized to the specific performance requirements of a vehicle for a specific route or trip, may lead to more cost efficient operations.

SUMMARY

One aspect of the novel concepts presented herein is changing operating parameters of a vehicle based on the vehicle current location. A telematics device in the vehicle (such as the GPS units disclosed herein) tracks the vehicles location. A fleet operator uses a back office application or remote server to define various behaviors based on the vehicle locations. Those definitions are conveyed to the vehicle in real time via a wireless data link. A data connection between the telematics/GPS device inputs those definitions to various vehicle controllers, changing the vehicles behavior.

The remote server application monitors the vehicle's location, and when a vehicle approaches a location (i.e., a user defined location or a user defined geographical area, such as manufacturing complex or an airport) for which a zone based behavior has been defined, that behavior is sent to the vehicle. In at least some embodiments, users will be able to define how close a vehicle needs to get to a zone before the zone based behavior is communicated to the vehicle over a wireless data link (such as a cellular, satellite, or Wi-Fi data link, noting Wi-Fi is generally only appropriate in locations with dense Wi-Fi connectivity). For vehicles assigned to relatively long routes and relatively few zone based behavior definitions apply, the zone based behavior might be sent to the vehicle when the vehicle is within 100 miles (or 50 miles, or 25 miles, such distances being exemplary and not limiting) of the zone. For vehicles assigned to local routes in areas where many different zone based behavior definitions apply, the zone based behavior might be sent to the vehicle when the vehicle is within 5 miles (or 2 miles, or 1 mile, such distances being exemplary and not limiting) of the zone.

The concepts disclosed herein also encompass sending all zone based behavior definitions to the vehicle, and letting the vehicle monitor its location, to determine if any such zone based behavior definitions apply to the vehicles current location. Such embodiments will require some amount of dedicated memory resources at the vehicle in which the zone based behavior definitions can be stored. In another embodiment, the remote server will include all appropriate zone based behavior definitions to a vehicle based on the vehicle's scheduled route for a particular time period (such as day, week, or month, noting that such time periods are exemplary and not limiting).

When the vehicles current location corresponds to some zone based behavior definition, the zone based behavior will be imposed. In some embodiments, the zone based behavior definition corresponds to a specific driver behavior, and that behavior (i.e., instructions) is presented to the driver on an in vehicle display (or in some embodiments, sent to a mobile computing device, such as a tablet or smart phone, assigned to the driver, noting that in such embodiments the tablet/smart phone should be mounted to a cradle to enable hands free operation). When the vehicle leaves the location, the instructions can be automatically removed from the display.

In some embodiments, the zone based behavior definition corresponds to a specific vehicle behavior, and that behavior (i.e., instructions) is conveyed to an appropriate vehicle controller to implement the desired behavior. When the vehicle leaves the location, the controller function will automatically revert to its prior state.

Exemplary zone based vehicle definitions include: A tank farm may want to inhibit regeneration while inside their boundaries. This can be implemented by revising vehicle controller programming relating to automatic diesel particle filter regeneration such that no regeneration is allowed at that zone. A port may want a 15 mph truck limit. This can be implemented by revising vehicle controller programming relating to speed control such that vehicle speed is limited to 15 MPH in that zone. A warehouse may want lights off. This can be implemented by revising vehicle controller programming relating to light control such that no lights are allowed at that zone.

Exemplary zone based driver definitions include: A tank farm may have a rule that vehicles cannot idle in the tank farm (must be moving or shut down). This can be implemented by displaying instructions to that effect to the driver using an in vehicle display. In at least some embodiments, an alert is automatically sent to the remote user if the driver violates the rules. In other embodiments, the display (and/or a flashing light, or an audible alarm) is used to alert the driver when rules are violated.

Yet another aspect of the concepts disclosed herein relates to remotely imposing changes in vehicle behavior to facilitate theft recovery. The remote user can wirelessly send derate commands (that is commands to reduce some maximum permitted level) to a vehicle, and the appropriate vehicle controller programming would be altered to effect the desired change. For example, such a change might set the maximum vehicle speed to a relatively low level, such that the vehicle could still be driven, but only at a maximum speed of 15 MPH or 25 MPH (such speeds being exemplary, but not limiting). Such relatively low speeds will enable local law enforcement to catch the vehicle, and will also draw attention to the vehicle, increasing the likelihood that a law enforcement officer will stop the vehicle even if that officer has not received notification that the vehicle has been stolen.

The above noted methods are preferably implemented by at least one processor (such as a computing device implementing machine instructions to implement the specific functions noted above) or a custom circuit (such as an application specific integrated circuit).

Moreover, skilled persons will readily recognize that various techniques described in parent application Ser. No. 15/005,746 for determining a metric to evaluate driver performance can be used to evaluate driving while zone based mandated driving behaviors are in place.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 6:
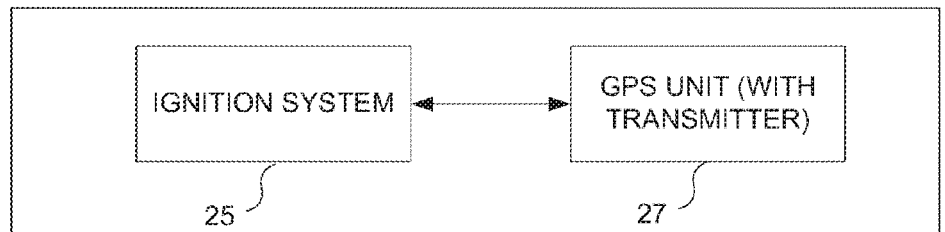
Figure 7:
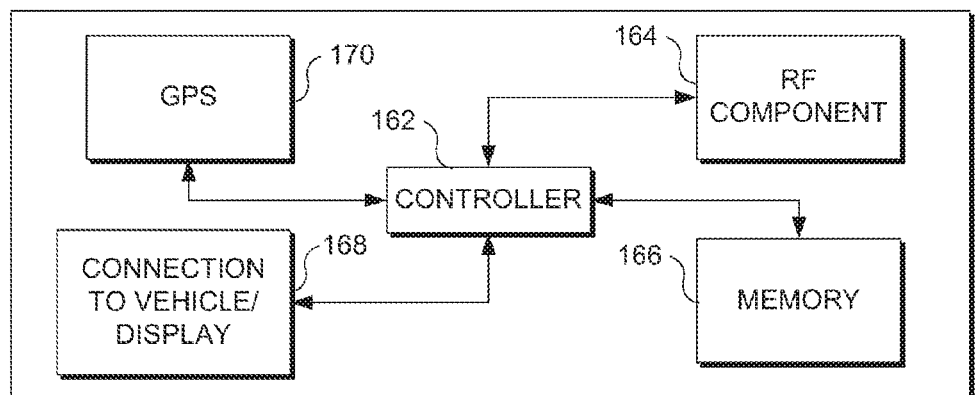
Figure 8:
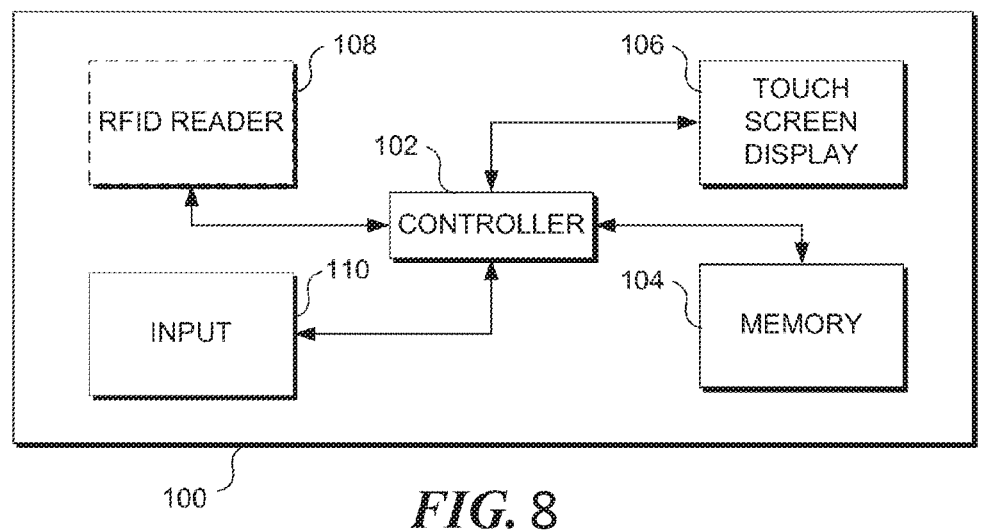
Figure 9:
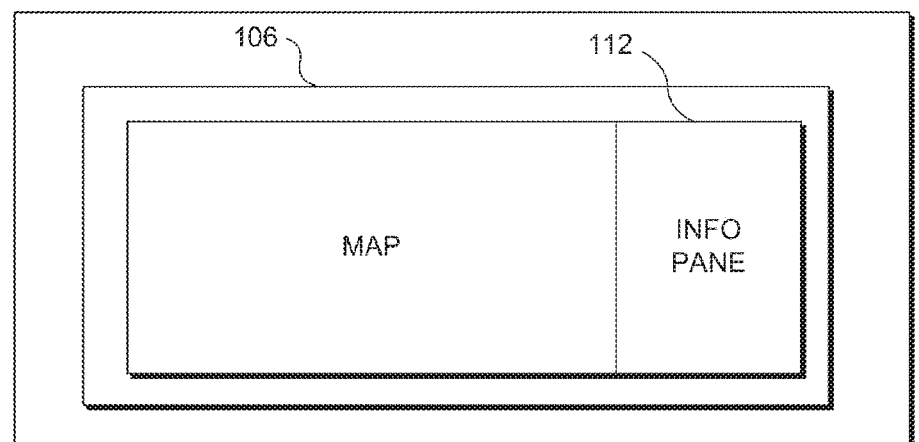
Figure 10:
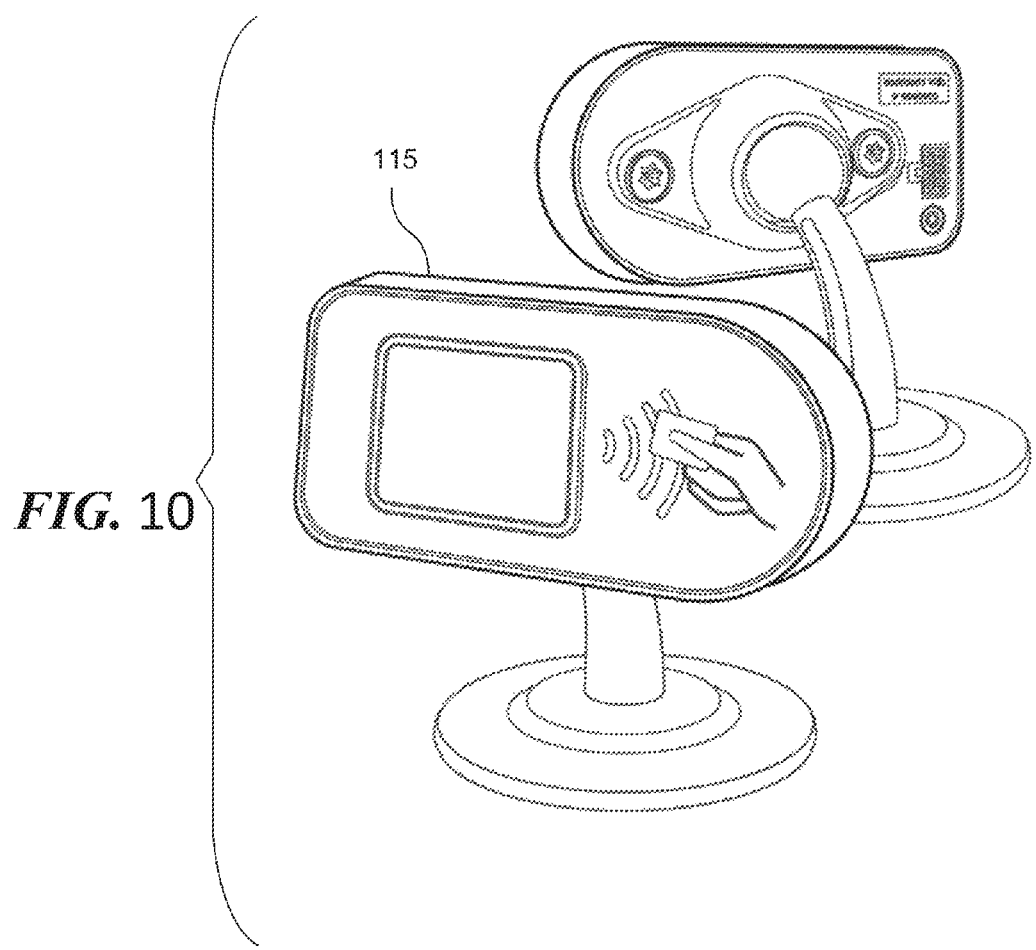
Figure 11:
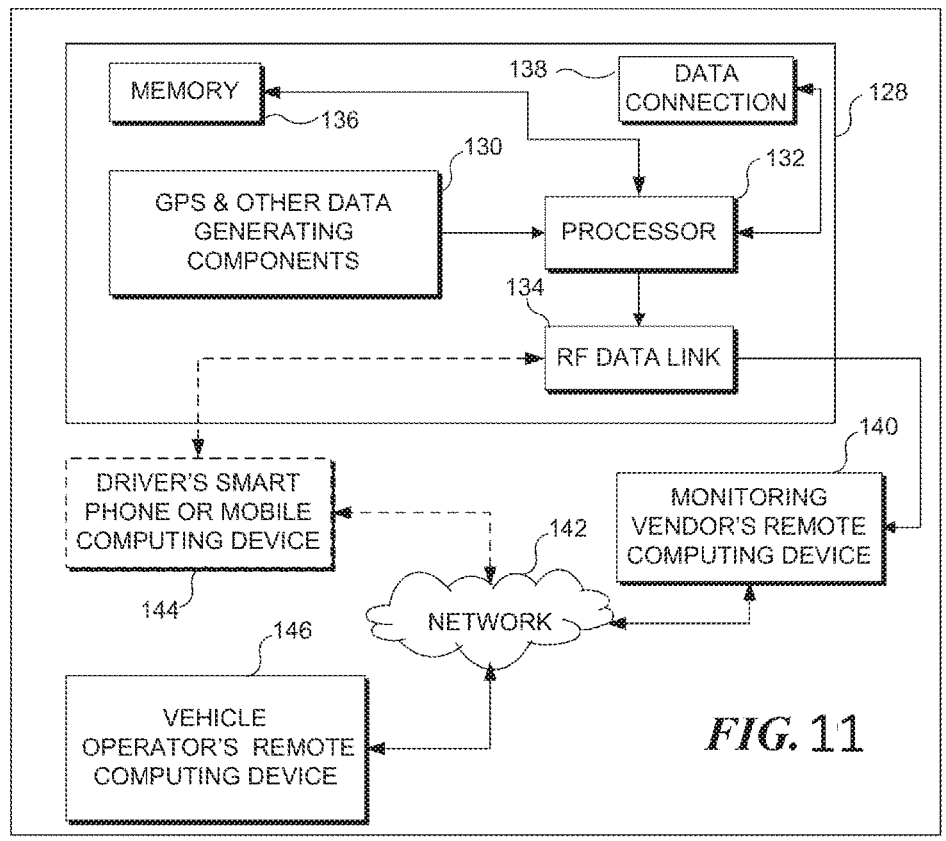
Figure 12:
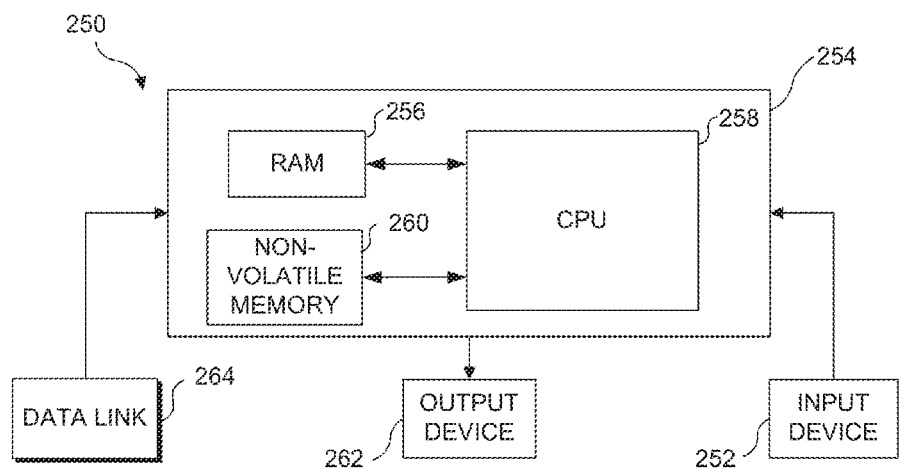

FIG. 6 schematically illustrates a vehicle that includes a GPS unit with a wireless transmitter utilized in some embodiments disclosed herein;

FIG. 7 is a functional block diagram of an exemplary telematics device added to an enrolled vehicle to implement one or more of the methods disclosed herein;

FIG. 8 is a functional block diagram of an exemplary telematics oriented tablet for in vehicle use that may be employed in accord with some aspect of the concepts disclosed herein;

FIG. 9 is a functional block diagram of an exemplary telematics oriented tablet for in vehicle use implementing a navigation app that is presented to the driver during vehicle operation, such that an info pane is not consumed by the map portion, and any zone based driver behavior rules imposed by a remote user for a predefined location or zone can be visually presented to the driver on the info pane;

FIG. 10 schematically illustrates an accessory display that can be used along with a processor in the vehicle to display any zone based driver behavior rules imposed by a remote user for a location the vehicle is approaching as has arrived at, where the accessory display can also be used to uniquely log in drivers, so any reports identify the correct driver;

FIG. 11 is a functional block diagram illustrating exemplary elements in a zone based vehicle/driver behavior monitoring system in accord with one aspect of the concepts disclosed herein; and FIG. 12 is an exemplary computing environment for implementing some of the concepts disclosed herein.

Figure 13A:
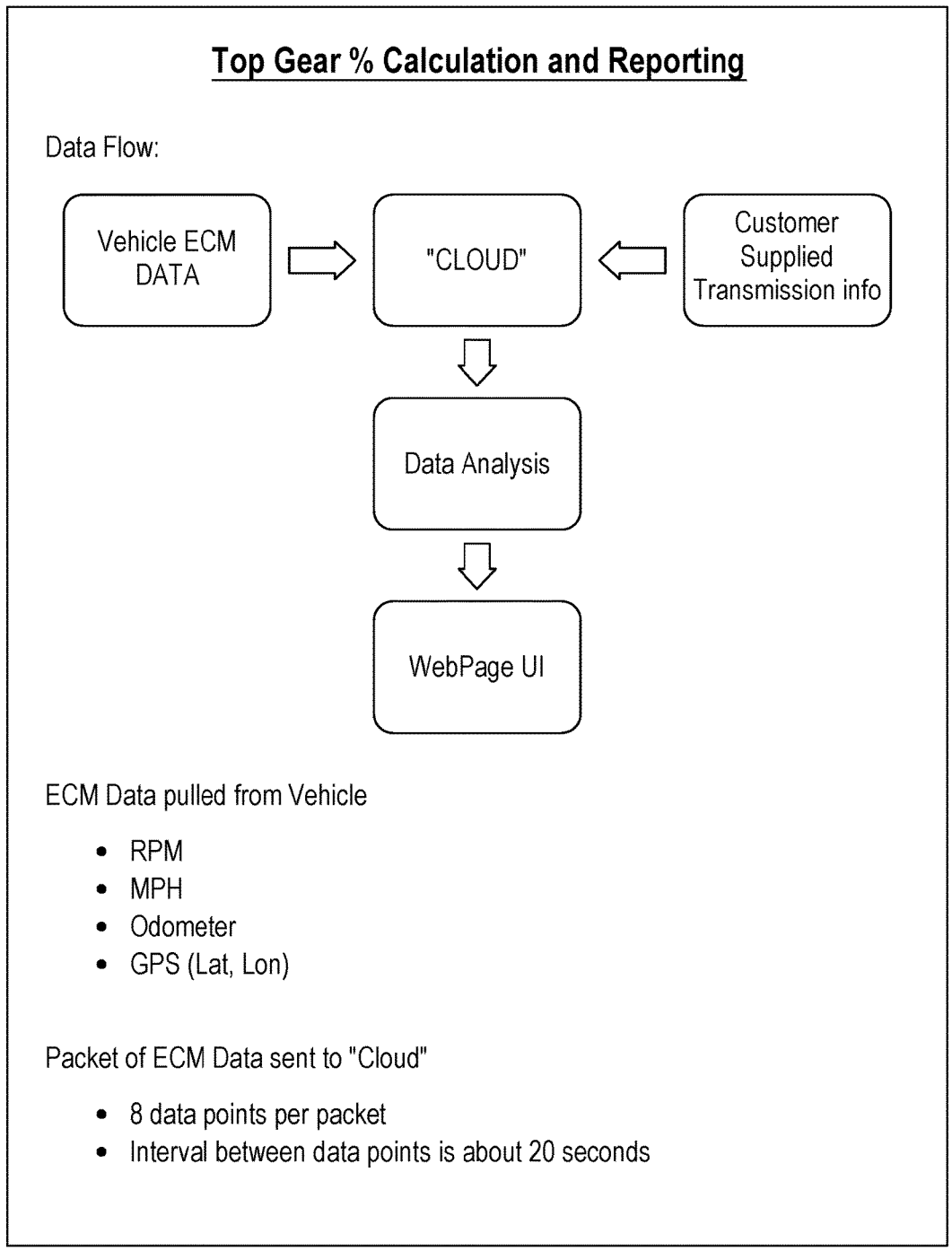

FIGS. 13A and 13B provide details of an exemplary technique to generate a top gear metric of how well a driver performed based on a top gear usage fuel efficiency metric tracking the drivers use of top gear, and how that efficiency rating translated into additional fuel costs, using data collected from the vehicle and an understanding of the vehicle's design characteristics.

DETAILED DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits). As used herein and in the claims that follow, the terms processor and controller have been used interchangeably with respect to describing an element to implement a specific logical function, and applicant intends the terms to be interpreted broadly, as encompassing elements that implement specifically defined logical functions (which in some cases rely on machine instructions stored in a memory to implement the function). Even where the term processor is used in place of the term controller, applicant believes that the artisan of skill would be able to readily determine from the disclosure provide herein what additional elements, such as peripherals (ports, clock, timers, UARTs, and ADC) and memory (including, but not limited to EEPROM, SRAM, EPROM, and flash) will be used in connection with such a processor to implement the described logical function.

Exemplary Logic for Imposing Zone Based Behavior to Drivers/Vehicles

Figure 1:
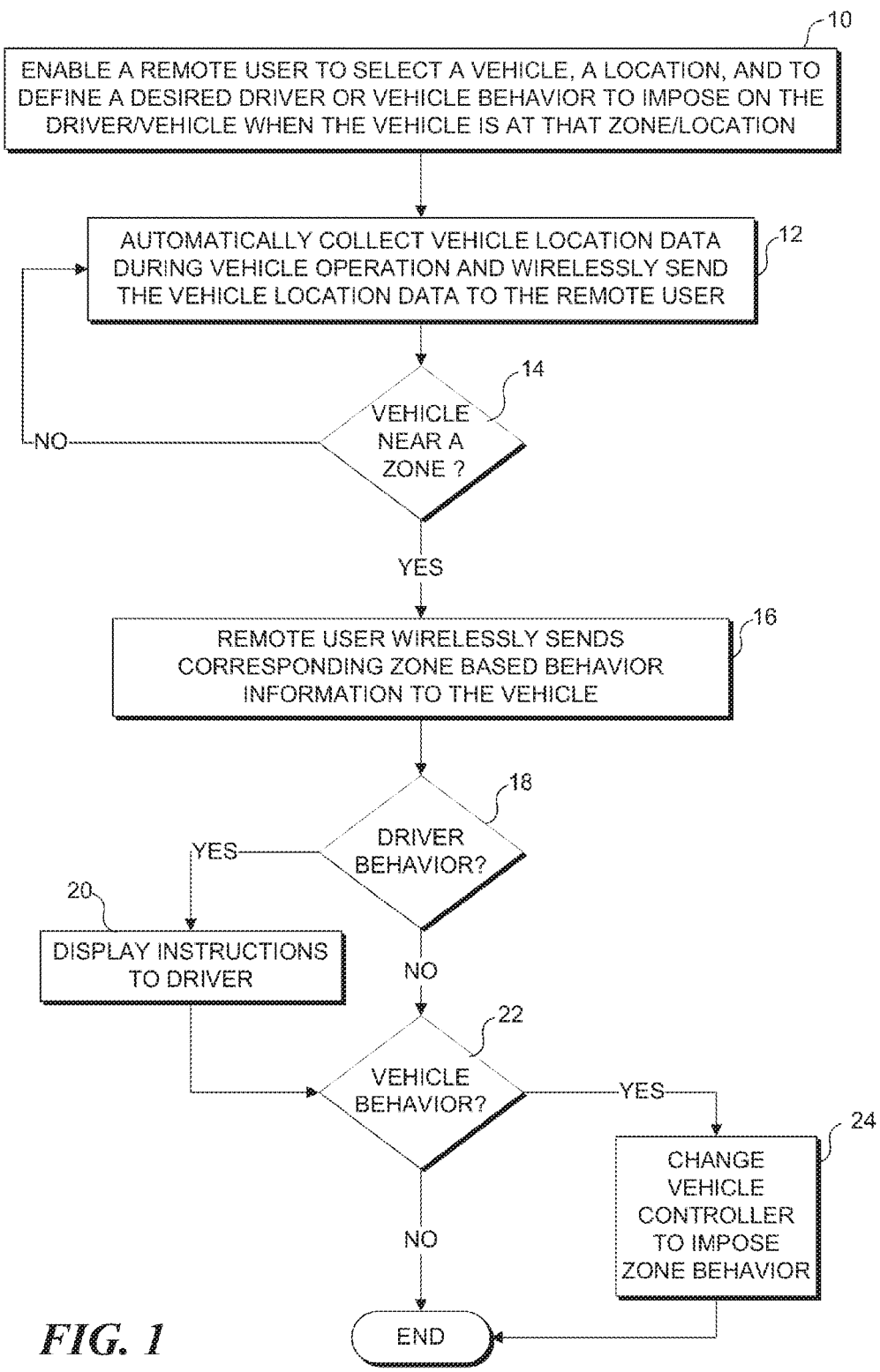
FIG. 1 is a high level flow chart showing the overall method steps implemented in accord with one exemplary embodiment for achieving the concepts disclosed herein, in which a remote user monitors a vehicle's location and sends zone based behavior instructions to the vehicle when the vehicle approaches the zone.

FIG. 1 is a high level flow chart showing the overall method steps implemented in accord with one aspect of the concepts disclosed herein. In general, the method being disclosed will be used by operators of fleets of vehicles. While it could be used in the context of a single vehicle, it will likely be of particular value to fleet operators. Certain steps of the method are implemented by a user accessing an application that allows the user to select locations, vehicles, and define one or more zone based behaviors. Certain steps of the method are automatically implemented by a controller remote from the vehicle. Certain steps of the method are automatically implemented by a controller located at the vehicle.

Figure 5:
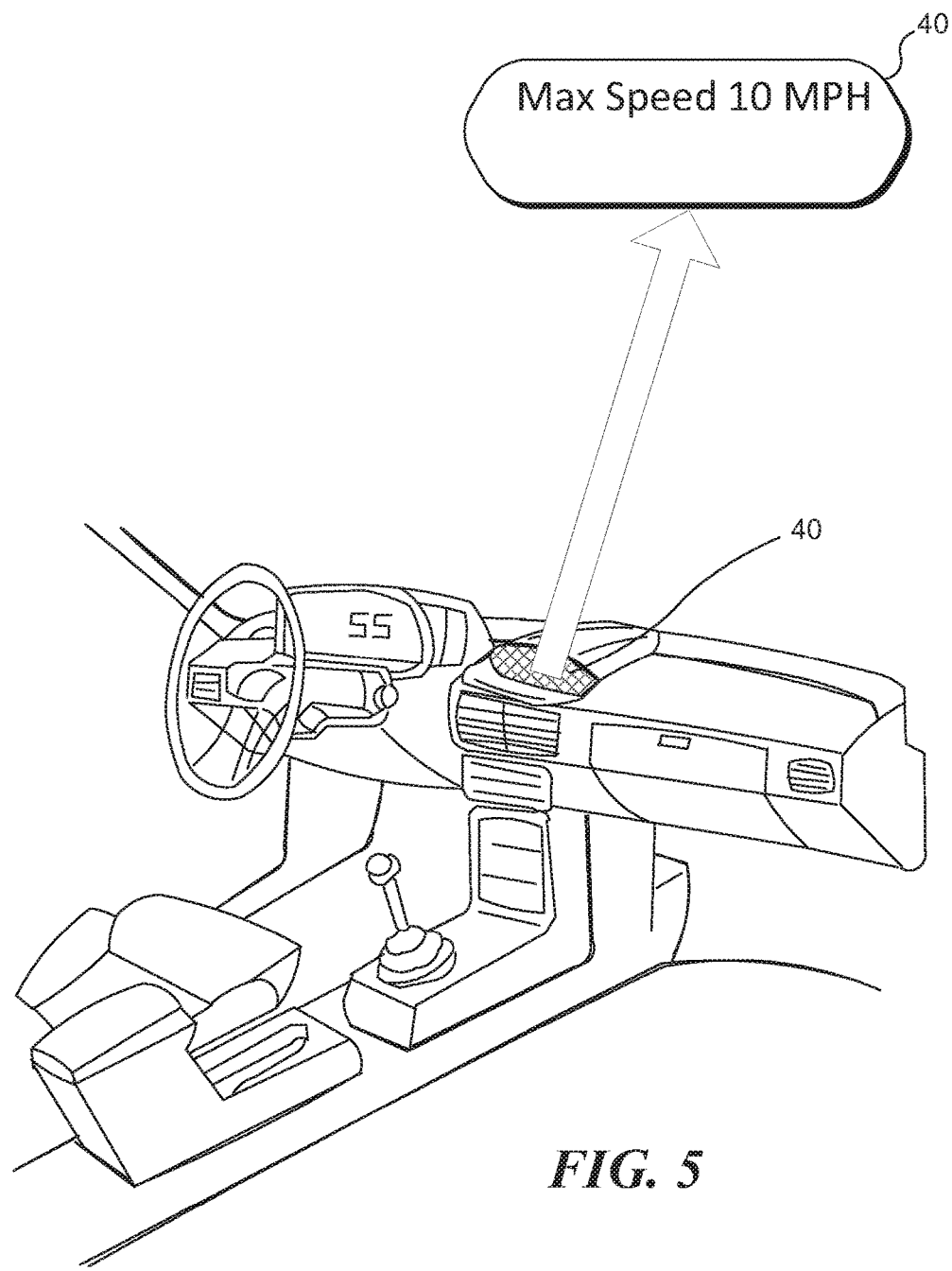
FIG. 5 is an illustration of a vehicle cab having a display for providing driver instructions.

Referring to FIG. 1, in a block 10 a user remote from a vehicle is able to utilize an application to select a location (and in some embodiments a specific vehicle, noting that in other embodiments the zone based behavior definitions will apply to all fleet vehicles), and to define a zone based behavior for that location. In at least some embodiments, selecting the location will involve the user interacting with a map. The location may be a specific coordinate (i.e., a specific latitude and longitude), or a more generalized location (such as a state, county, or city). In at least some embodiments the remote user will be able to define a geo-fence (a virtual perimeter for a real-world geographical area), and the zone based behavior will apply within that geo-fence.

Where the zone based behavior definition relates to driver behavior, in at least some embodiments the remote user can enter any textual instructions they desire to be displayed to the driver when a vehicle is at the specified zone/location. More common behaviors can be selected using a menu. Where the zone based behavior definition relates to vehicle behavior, in at least some embodiments the remote user can select from one or more predefined options, some of which enable the user to fine tune the behavior (i.e., where the behavior is speed based, the user will be able to select a desired speed limit). FIGS. 5 and 10 show display types for conveying this information to the driver.

In a block 12, a telematics device at the vehicle (noting that this can be simultaneously implemented by a fleet of vehicles) collects vehicle position data during vehicle operation. That vehicle position data is wirelessly communicated to a remote monitoring service (generally the same remote service employed to implement the steps of block 10, although the functions could be distributed to different computing systems). In general, the vehicle location is updated on a frequent basis (i.e., once every 5 minutes or less during normal vehicle operation, noting that the specific time interval between updates can vary considerably). In a block 14 the remote monitoring service analyzes the vehicle location to determine if the vehicle is approaching a location for which a zone based behavior definition has been defined. In at least some embodiments the remote user will be able to define how close the vehicle needs to get to a defined zone before any action is taken. In other embodiments that distance is predefined and not user selectable. Exemplary distances include 1 mile, 5 miles, and 10 miles, although the concepts disclosed herein are applicable to significant variation with regard to how close is "close enough". If the vehicle is not close to a location for which a zone based behavior has been defined, the logic loops back to block 12 and additional position data is received from the vehicle, and analyzed.

If in decision block 14 it is determined that the vehicle is approaching a location for which a zone based behavior has been defined, then in a block 16 the remote processor implementing block 14 automatically wirelessly conveys the corresponding zone based behavior definition to the vehicle. The method steps of the following blocks are implemented by a vehicle controller.

In a block 18 a vehicle controller determines if the zone based behavior definition applies to driver behavior. If so, then the zone based behavior definition is automatically presented to the driver on an in vehicle display (block 22). The concepts herein also encompass embodiments in which the zone based behavior definition is presented to the user audibly, using a speaker in the vehicle. The logic then is processed to a block 22. If in block 18 the vehicle controller determines if the zone based behavior definition does not apply to driver behavior, block 20 is skipped and the logic moves directly to block 22.

In block 22 the vehicle controller determines if the zone based behavior definition applies to vehicle behavior. If not, the logic terminates. However, if the zone based behavior definition applies to vehicle behavior, then in a block 24 changes are automatically made to the vehicle controller able to impose the desired behavior. The logic then terminates (however, as discussed below in connection with FIG. 2, in at least some embodiments the controller programming reverts to its prior state after the vehicle leaves the zone).

Figure 2:
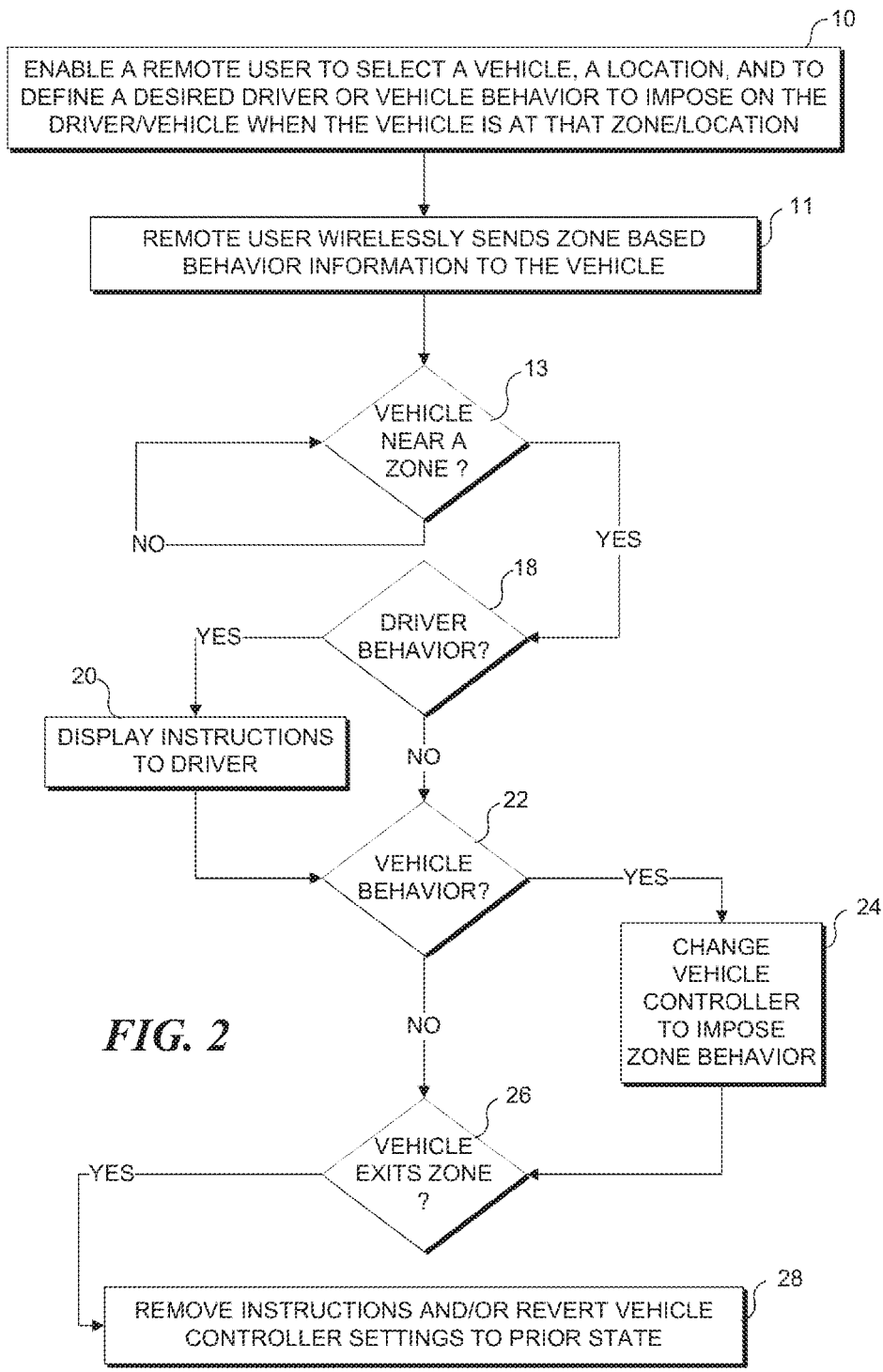
FIG. 2 is a high level flow chart showing the overall method steps implemented in accord with one exemplary embodiment for achieving the concepts disclosed herein, in which a remote user sends one or more zone based behavior instructions to a vehicle, and the vehicle monitors its location and implements the zone based behavior instructions when the vehicle approaches the zone.

Significantly, in the method of FIG. 1, the remote user/remote monitoring service was responsible for monitoring a vehicle's location, and the zone based behavior definitions are sent to the vehicle when the vehicle approaches the zone. In the method of FIG. 2, the zone based behavior definitions are sent to the vehicle upon creation (or after being affirmatively selected by a remote user), and the vehicle monitors its location and implements the zone based behavior instructions when the vehicle approaches the zone. Again, certain steps of the method are implemented by a user accessing an application that allows the user to select locations, vehicles, and define one or more zone based behaviors, while certain steps of the method are automatically implemented by a controller remote from the vehicle, and certain steps of the method are automatically implemented by a controller located at the vehicle.

Referring to FIG. 2, in block 10 a user remote from a vehicle is able to utilize an application to select a location (and in some embodiments a specific vehicle, noting that in other embodiments the zone based behavior definitions will apply to all fleet vehicles), and to define a zone based behavior for that location. In at least some embodiments, a plurality of the zone based behavior definitions will have been defined, and the remote user is able to select a specific location and a specific zone based behavior definition. In a block 11, a processor remote from the vehicle automatically wirelessly conveys the selected zone based behavior definitions to the vehicle. Note the method steps of the following blocks are implemented by a vehicle controller.

In a block 13, a telematics device at the vehicle collects vehicle position data during vehicle operation, and determines if the current vehicle location is near a zone. Note that because the zone based behavior definition is already at the vehicle, the logic of block 13 may be triggered only when the vehicle actually is at (i.e., not approaching, or 1, 2, 5, or 10 miles out), the defined zone. If the vehicle is not currently at or approaching a defined zone, the logic loops back to block 13 and the location of the vehicle continues to be monitored and compared to the defined locations (i.e., the zone based behavior definitions sent to the vehicle in block 11, including zone based behavior definitions that may have been sent previously). If in block 13 the vehicle controller analyzing the vehicle location and the zone based behavior definitions determines that the vehicle is at (or approaching) a location corresponding to a zone based behavior definitions, the logic moves to block 18.

As before, in block 18 a vehicle controller determines if the zone based behavior definition applies to driver behavior. If so, then the zone based behavior definition is automatically presented to the driver on an in vehicle display. The concepts herein also encompass embodiments in which the zone based behavior definition is presented to the user audibly, using a speaker in the vehicle. The logic then is processed to a block 22. If in block 18 the vehicle controller determines if the zone based behavior definition does not apply to driver behavior, block 20 is skipped and the logic moves directly to block 22.

Again, in block 22 the vehicle controller determines if the zone based behavior definition applies to vehicle behavior. If not, the logic moves to a block 26. However, if the zone based behavior definition applies to vehicle behavior, then in a block 24 changes are automatically made to the vehicle controller able to impose the desired behavior. The logic then moves to a block 26, which is implemented only when the vehicle moves away from (i.e., leaves) the zone for which the zone based behavior definition applied. Once the vehicle leaves that location (as detected by the position sensing component at the vehicle), then in a block 28 the controller programming reverts to its prior state (and/or the displayed instructions to the driver are removed).

Figure 3:
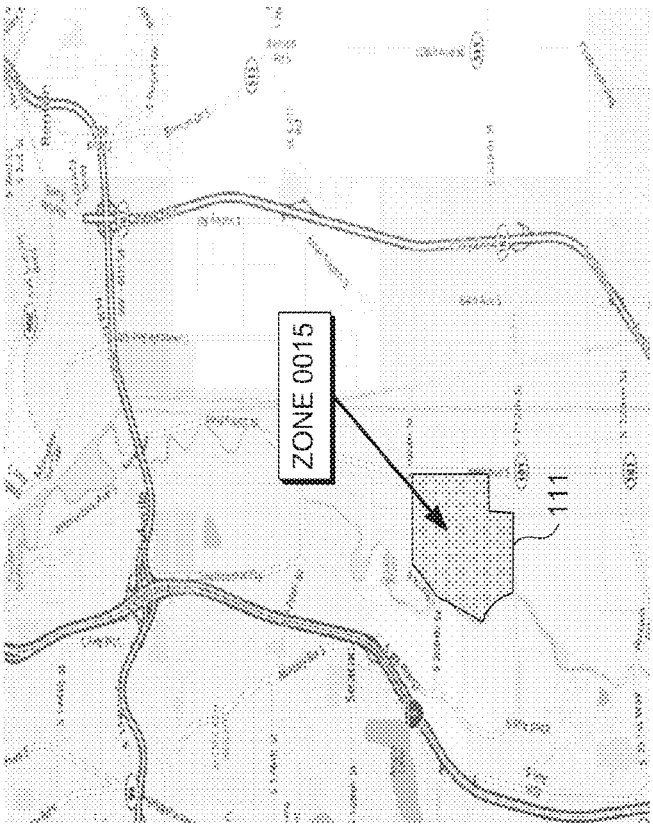
FIG. 3 is an exemplary screen shot of a webpage accessed by a remote user to define zone based behaviors for vehicles and/or drivers in accord with the concepts disclosed herein.

FIG. 3 is an exemplary screen shot of a webpage accessed by a remote user to define zone based behaviors for vehicles and/or drivers in accord with the concepts disclosed herein. It should be understood that the exemplary webpage of FIG. 3 is based on providing web based software tool to fleet operators and/or vehicle owners to define based behaviors for vehicles and/or driver. A similar graphical user interface could be implemented as part of a stand-alone software package, but will most often be deployed as part of a suite of fleet based telematics applications, which likely will include a track and trace functionality (i.e., the ability to remotely monitor vehicle locations, and the ability to view vehicle locations overlaid onto map data).

Referring to FIG. 3, a webpage 101 includes a first portion 103 that enables a remote user to select a specific asset (and/or a specific driver) from among a plurality of assets (and or drivers). It should be understood that the concepts disclosed here in encompass enabling remote users to define zone based behavior definitions and apply those definitions remotely to one or more of: an individual driver, a subset of all the drivers in a fleet, all of the drivers in a fleet, an individual vehicle, a subset of all the vehicles in a fleet, all of the vehicles in a fleet. In an exemplary embodiment the remote user will be provided with menu options enabling the remote user to define a specific date and time (or a range or dates and times) for when the zone based behavior definitions apply. As shown in FIG. 3, the remote user has decided to apply the zone based behavior to all vehicles (assets) and all drivers, using the selection/text boxes in section 103.

Webpage 101 also includes a portion 105 that enables a remote user to define a specific driver behavior to impose in a specific zone. Portion 105 includes a text box into which the remote user defines the desired behavior. Essentially, the remote user is crafting rules (i.e., zone based driver behavior definitions) to inform the driver of what rules apply in the defined zone. Often such rules will have been defined by an owner or operator of a location (such as an industrial or manufacturing plant the driver will be delivering cargo to our picking up cargo from). The rules may also be based on knowledge the remote user has about the area and wants drivers to adhere to a set of behaviors in that area (i.e., the zone is heavily congested and accidents are frequent, and the remote user wants to impose a lower than legal speed limit in the zone to reduce accidents, or the zone is mountainous and proper gear and RPM selection is crucial to maintaining good fuel economy, and the remote user wants to impose a specific set of operating conditions in the zone to maximize fuel efficiency). As shown in FIG. 3, the remote user has crafted a zone based driver behavior definition which, when presented to the driver as the driver approaches and/or arrives at that zone, informs the driver that a particular entrance to the facility at the zone must be used, that the vehicle lights must always be on in the zone, that a maximum speed limit in the zone is 10 MPH, and that no idling is allowed in the zone (vehicle must be in motion or shut down, recognizing that relatively small amounts of idle (on the order of a few minutes) may be required). Note that, in general, zone based driver behavior definitions are advisory in nature, and the driver must participate in honoring them (though the concepts disclosed herein encompass tracking driver behavior, and reporting non-compliance to the remote user). In contrast, zone based vehicle behavior definitions are imposed by selectively changing vehicle controller programming to enforce the defined behavior. As shown in FIG. 3, the remote user has selected the option of reporting non-compliance to the remote user, and has not selected the option of alerting the driver when non-conformance is detected (such alerts can be provided to the driver via an in-vehicle display, sent to a mobile computing device such as a tablet or smart phone, and/or can be played over a speaker at the vehicle). Participating vehicles will be equipped with telematics devices that gather vehicle and driver based information from the vehicle and communicate that data to the remote user (often a fleet monitoring vendor that provides such services to fleet operators). An exemplary telematics device is described below. In general, such a device will be able to establish a two way wireless data link with the remote user, will be able to monitor vehicle and driver behavior (including vehicle position data), will be able to receive from the remote user modified vehicle programming instruction sets for zone based vehicle behavior definitions and communicate such instructions sets to the appropriate vehicle controllers, will be able to receive from the remote user zone based driver behavior definitions, and will be able to display (or communicate with a display) those zone based driver behavior definition received from the remote user when approaching or arriving at the defined zone.

Webpage 101 also includes a portion 107 that enables a remote user to define a specific vehicle behavior to impose in a specific zone. Portion 107 includes a plurality of predefined vehicle behaviors that can be imposed. In general, the available vehicle behaviors will be a function of the design of a specific vehicle, and the ability of that vehicle to receive over the air controller reprogramming to impose specific behaviors. Where the imposed behavior deals with an aftermarket component (aftermarket lights, aftermarket power take off units (PTOs), aftermarket lifts, such reprogramming will likely be readily achievable. Where the controller that needs to be reprogrammed is a core EOM ECU, in general the manufacturer will need to have designed the system to enable such reprogramming, or some "jail breaking" might be required. It should be noted that vehicle manufacturers are recognizing the potential value of remote ECU reprogramming, and such functionality is likely to be designed into the next generation of vehicles. FIG. 3 graphically illustrates a list of exemplary predefined vehicle behavior definitions. It should be understood that the list presented is exemplary, not limiting, as many other behaviors are possible. It also should be recognized that such a list may be highly dependent on the specific vehicle. While not shown, in at least one embodiment the list presented to the remote user will have been filtered based on the asset selected, based on information about the vehicle capabilities accessible to the processor implementing webpage 101. As shown in FIG. 3, the remote user has selected the menu item referencing that no diesel particulate filter regeneration is allowed in the defined zone. To impose that behavior, modifications to the vehicle controller responsible for automated diesel particulate filter regeneration will be provided to the vehicle, and implemented when the vehicle arrives (or approaches some predefined distance) at the zone. The other behaviors will be imposed by similar implementing control logic changes at the vehicle controller responsible for the defined behavior.

With respect to the no idle behaviors, in at least one embodiment when the no idle behavior is selected, the remote user is prompted to enter in a maximum allowable idle time before the vehicle forces a shut down. Exemplary, but not limiting maximum allowable idles times include 1 minute, 2 minutes, 5 minutes, and 10 minutes. In at least one embodiment when the no idle behavior is selected, a default maximum idle time value is applied (noting that exemplary, but not limiting maximum allowable idles times include 1 minute, 2 minutes, 5 minutes, and 10 minutes).

With respect to the maximum speed behavior, in at least one embodiment when the maximum speed behavior is selected, the remote user is prompted to enter in a maximum allowable speed before the vehicle ignores further speed increase commands from the driver. Exemplary, but not limiting maximum allowable speeds include: 2 MPH, 5 MPH, 10 MPH, 15 MPH, 25 MPH, and 40 MPH. Relatively lower speeds will be likely associated with zones related to industrial plants, hospitals, schools, ports, etc., while relatively higher speeds will likely be associated with zones related to cities, sections of highway prone to accidents, etc.

Finally, webpage 101 also includes a portion 109, which is a map that the remote user can manipulate to define a zone where the zone based behavior will apply. As shown in FIG. 3, the remote user has drawn a geo-fence 111 around an area representing an industrial facility. In additional to custom geo-fenced areas, remote users may also be able to access predefined geo-fenced areas, such as schools, cities, counties, neighborhoods, etc. Remote users may also define specific coordinates. Where a single coordinate is selected, in at least one embodiment the user is prompted for an expansion factor, so that the zone based behavior definition is imposed in that expanded area. Exemplary expansion factors include, but are not limited to, 100 feet, 200 feet, 300 feet, 500 feet, 1000 feet, ¼ mile, ½ mile, and 1 mile. Note that each user defined zone is provided with a unique description (see ZONE 0015 in the text box), so that remote users can define many different zone based behavior definitions, store them, and selectively have those definitions apply based on interactions with webpage 101 or a variant thereof.

Figure 4A:
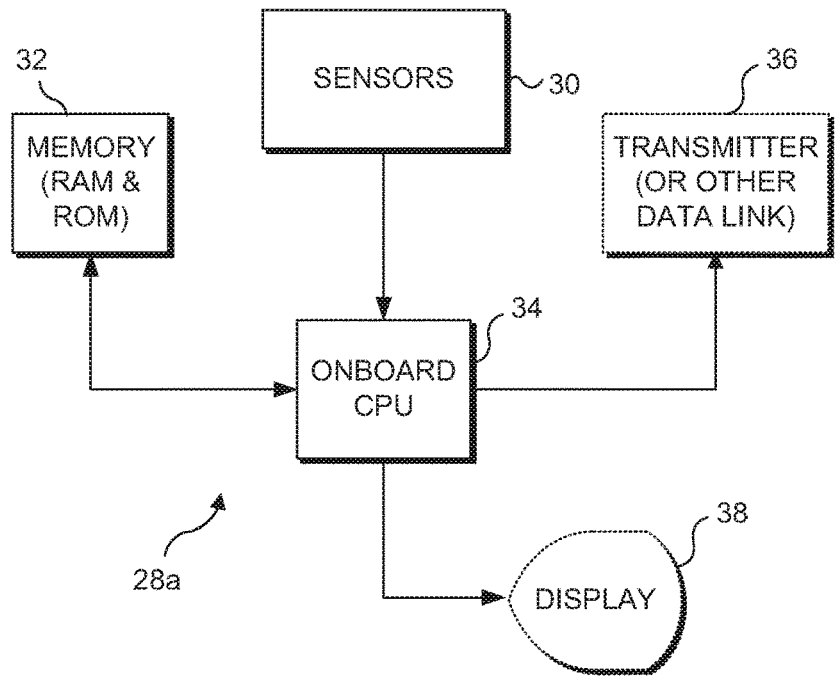
FIG. 4A is a functional block diagram illustrating the functional elements of an embodiment in which the metrics are processed within the vehicle to verify vehicle adherence to zone based vehicle behavior.

GPS unit 27 preferably includes or is connected to a wireless transmitter (not separately shown), such that the GPS data can be wirelessly transmitted to a remote computing device, preferably in real-time. The remote computing device can be programmed to manipulate the GPS data to determine a plurality of metrics, which can then be used to calculate a driver's performance or performance ranking, generally as described above, while zone based driving restrictions are mandated. It should be recognized that as an alternative, GPS unit 27 can include an onboard memory, such that the GPS data are stored in the GPS unit, to be uploaded to a remote computing device at a later time (for example, using a wireless or hardwired data link). Significantly, GPS unit 27 enables determination of vehicle presence in a predefined zone to be determined, even if the vehicle is not equipped with separate other sensors of the metric data or an onboard computer (as are required in the embodiments of FIGS. 3 and 4A). It should be understood that the concepts disclosed herein encompasses coupling such a GPS unit to vehicle sensors and/or a vehicle data bus, such that driver/vehicle performance data collected by other vehicle sensors can be combined with GPS data and conveyed to a remote computing site. While not specifically shown in FIG. 6, it should be understood that GPS unit 27 can include a processor that uses GPS data and sensor data collected from the vehicle to verify vehicle conformance to zone based driving instructions, which are then combined with GPS data and conveyed to the remote computing site. One such instruction is a ban on diesel filter regeneration FIG. 4A is a functional block diagram 28a illustrating the functional elements of an exemplary embodiment in which the metrics are processed within the vehicle to obtain the driver's performance ranking. The vehicle is equipped with sensors 30 configured to collect the required metrics. The sensors are logically coupled with an onboard vehicle CPU 34, which is configured to implement the method steps generally described above. CPU 34 is logically coupled to a memory 32 in which are stored the machine instructions that are executed by the CPU to carry out these logical steps. The plurality of metrics collected by sensors 30 can also be stored in memory 32. A (preferably optical or wireless) transmitter 36 (or other data link) can be included to enable either the plurality of metrics or the driver's performance ranking to be communicated to a remote computing device. An optional display 38 can be included in the vehicle to provide real-time feedback to the driver (by displaying the driver's performance ranking in real-time). As discussed above, if display 38 is implemented, it is desirable to provide the ability for the driver to determine which metrics are having the most impact on the driver's performance ranking. Skilled persons will readily recognize that this same technique can be used to evaluate driver compliance with zone based mandated performance.

Figure 4B:
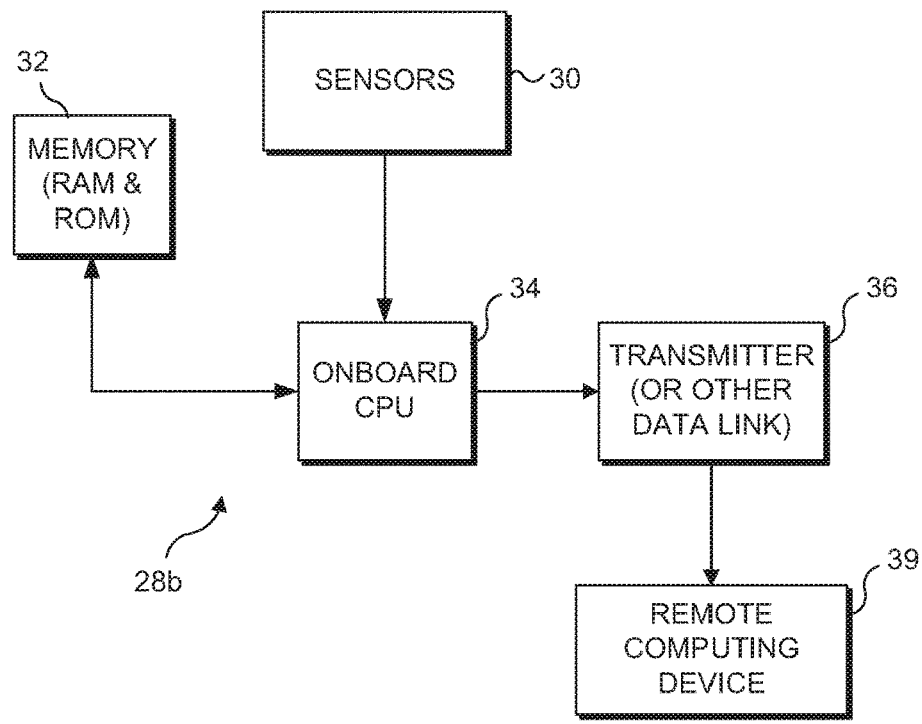
FIG. 4B is a functional block diagram illustrating the functional elements of an embodiment in which the metrics are processed by a computing device remote from the vehicle to verify vehicle adherence to zone based vehicle behavior.

FIG. 4B is a functional block diagram 28b illustrating the functional elements of an exemplary embodiment in which the metrics are processed by a computing device to obtain the driver's performance ranking, where the computing device is remote from the vehicle. Once again, the vehicle is equipped with sensors 30 configured to collect the required metrics. The sensors are logically coupled with an onboard vehicle CPU 34, which is configured to transmit the collected metrics to remote computing device 39 through transmitter 36 (or other data link). In a particularly preferred embodiment, transmitter 36 is a wireless transmitter. In such an embodiment, the method steps generally described above for processing the collected metrics can be executed by the remote computing device. CPU 34 is logically coupled to memory 32 in which the collected metrics can be stored, if the metrics are not to be transmitted to the remote computing device in real-time. Even if the metrics are transmitted to the remote computing device in real-time, such metrics can be stored in memory 32 as a backup in case the transmission is not successful. In such an embodiment, a display is not likely to be beneficial, unless the remote computing device is configured to transmit the calculated performance ranking back to the vehicle for display to the driver. Skilled persons will readily recognize that this same technique can be used to evaluate driver performance with zone based mandated performance Exemplary GPS Device with Onboard Computing Environment FIG. 6 schematically illustrates a vehicle 23 that includes a GPS unit 27 configured to collect GPS data that can be used to determine if an enrolled vehicle is approaching a location for which a remote user has established zone based driver/vehicle definitions. Generally as discussed above in connection with FIGS. 1 and 2, in some embodiments a remote monitoring service analyzes the GPS data received from enrolled vehicles to determine if a vehicle is approaching such a zone/location, whereas in other embodiments, the locations or zone based definition are sent from the remote server to the enrolled vehicle, and a processor in the vehicle makes a determination of whether any zone based behavior definition applies. In some embodiments, a list of locations is stored at the vehicle, and when the vehicle approaches a noted location the processor in the vehicle calls the remote server to obtain the zone based behavior definitions that apply to that location (the list of locations will consume fewer memory resources). Vehicle 23, such as a bus or a truck (or automobile, or construction equipment, generally as described above) includes GPS unit 27 coupled with an ignition system 25 of the vehicle. In an exemplary embodiment, the GPS unit 27 will be coupled with the ignition switch, such that it is assumed that when the ignition switch is on, the engine of the vehicle is actually running, and the GPS unit 27 will be activated. As described in greater detail below, GPS data can be used for a plurality of metrics, including idle time, deceleration time and magnitude, acceleration time and magnitude, and to determine if a driver has violated a speed limit. The most basic GPS unit is able to determine a position of the vehicle at a specific time. That positional information can be used to calculate the speed of a vehicle by determining the change in position of the vehicle between two successive points in time, and to calculate the acceleration or deceleration of the vehicle by determining the change in speed of the vehicle over a time increment. More typically, GPS units automatically determine position, speed, and acceleration/deceleration internally, and these metrics would then not need to be determined by an external computing device (remote or local).

GPS unit 27 preferably includes or is connected to a wireless transmitter (not separately shown), such that the GPS data can be wirelessly transmitted to a remote computing device, preferably in real-time. As noted above in connection with the method of FIG. 1, the remote computing device can be programmed to monitor vehicle location and zone based behavior definitions, such that when a vehicle approaches such a zone, the corresponding zone based behavior definition is conveyed to the vehicle (preferably with sufficient advance timing so that the zone based behavior definition is available at the vehicle when the vehicle arrives at the defined location). It should be recognized that as an alternative, GPS unit 27 can include an onboard memory, such that either the zone based behavior definitions (or at least the locations/zones) are stored in the GPS unit, and the GPS unit monitors the location of the vehicle to determine if any zone based behavior should apply. It should be understood that the concepts disclosed herein encompasses coupling such a GPS unit to vehicle sensors and/or a vehicle data bus, such that driver behavior can be monitored, to determine if the driver has complied with any zone based driver behavior definitions presented to the driver at a particular location. While not specifically shown in FIG. 6, it should be understood that GPS unit 27 can include a processor that uses GPS data to determine if any zone based behaviors apply to the current vehicle location.

FIG. 7 is a functional block diagram of an exemplary telematics device added to an enrolled vehicle to implement one or more of the methods of disclosed herein. An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data connection component 168 (noting that in some embodiments a plurality of data connect ions are provided). Exemplary data connections include physical data links, as well as wireless data links such as Wi-Fi, IR, and Bluetooth™. Data connection component 168 enables zone based driver behavior definitions (or rules) to be conveyed to a display device to present to a user when the vehicle arrives at or approaches a location for which a remote user has defined a zone based driver behavior. Data connection component 168 also enables zone based vehicle behavior definitions (or programming instructions) to be conveyed to vehicle controller responsible for controlling a particle vehicle system (such as lights, diesel particulate filter regeneration, engine idling, and other behaviors generally as noted in portion 107 of FIG. 3, noting that such vehicle behaviors are simply exemplary, and are not intended to be limiting) when the vehicle arrives at or approaches a location for which a remote user has defined a zone based vehicle behavior.

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component 164 to wirelessly convey such data to vehicle owners. These data transmissions can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164. If desired, additional memory can be included to temporarily store data if the RF component cannot transfer data, and/or to store locations corresponding to defined zones (i.e., zones where specific vehicle or driver behaviors have been defined), or the specific zone based behavior definitions themselves (noting that storing the zones only will reduce memory demand, but will require a call to a remote server to obtain the specific zone based behavior definitions when the vehicle approaches a defined zone). In particularly preferred embodiments the RF components is GSM or cellular technology based.

In at least one embodiment, the controller 162 is configured to implement steps 12, 18, 20, and 22 of FIG. 1. In at least one embodiment, the controller 162 is configured to implement steps 13, 18, 20, 22, and 26 of FIG. 2. It should be understood that any of the vehicle based steps of FIGS. 1 and 2 could be distributed to one or more other processors/controllers at the vehicle.

Exemplary Tablet for in Vehicle Use to Present Zone Based Driver Behaviors to Driver FIG. 8 is a functional block diagram of an exemplary mobile computing device 100 for fleet telematics including a display 106 and a controller 102 configured to present at least one telematics application to a user, and to present a zone based driver behavior to a driver in accord with the concepts disclosed herein. A non-transitory physical memory 104 is included, upon which machine instructions define one or more applications are stored. Note that in embodiments including device 100 the zone based behavior definitions can be stored in memory 104, or locations corresponding to zones for which behaviors have been defined (noting if locations alone are stored, a call to a remote server for such behaviors will need to be made, generally as discussed above). Device 100 includes an optional RFID reader 108 (or other sensor) that enables drivers to log into the tablet, so that non-compliant behavior (in response to zone based driver behavior rules imposed at a selected zone) can be tracked to a specific driver. In exemplary but not limiting embodiments, the device includes at least one data input 110 that can be used to logically couple the device to a vehicle data bus or some other device (such as telematics device 160 of FIG. 7). Note that in embodiments where the current location of the vehicle is monitored to determine if the vehicle is approaching a location for which a zone based behavior has been defined, controller 102 can implement that function so long as the controller has access to the vehicle location data (from the exemplary devices of FIG. 6 or 7) and to the defined zone locations.

Device 100 may include additional components, including but not limiting to a GSM component, a Wi-Fi component, a USB component, a rechargeable battery, and in at least one embodiment a GPS component (in which case the GPS devices of FIGS. 6 and 7 are not required).

Significantly, the display (or speakers) of device 100 can be used to provide the zone based driver behavior rules in addition to, or instead of the display. Controller 102 can be employed in some embodiments to implement one of more of the vehicle side steps of FIGS. 1 and 2.

FIG. 9 is a functional block diagram of device 100 implementing a navigation app that is presented to the driver during vehicle operation on display 106. Significantly, an info pane 112 is not consumed by the map portion, and remains visible to the driver. Any the zone based driver behavior definition can be visually presented to the driver on info pane 112 when the driver approaches or arrives at a zone for which a remote user has defined a zone based driver behavior.

In one preferred embodiment, each driver is provided with an RFID tag, which can be scanned into device 100, or a secret pin number to identify him or herself to the tablet. As compliance with zone based driver behavior rules may be important to a driver's career development, it is important to have a system for unerringly identifying the driver credited with any non-compliant behavior. Other applications, such as the driver log application and inspection application, will similarly employ verifiable credentials. In at least one embodiment, the tablet cannot be used without first logging onto the tablet using verifiable credentials.

Exemplary Accessory Display for Presenting Zone Based Driver Behaviors to Driver Another aspect of the concepts disclosed herein is an accessory display that can be used in connection with a telematics device that itself might not include a display, such as the GPS based devices of FIGS. 6 and 7, to provide a display upon which zone based driver behavior rules can be presented to the driver when the vehicle approaches or arrives at a location for which a remote user has defined a behavior.

FIG. 10 schematically illustrates an accessory display 115 that can be used along with a processor in the vehicle to visually present zone based driver behavior rules to a driver, in accord with the concepts disclosed herein, where the accessory display can also be used to uniquely log in drivers, so any non-compliant behavior reports identify the correct driver. The accessory display does not possess significant processing power, and is used in connection with some other device at the vehicle that provides the required processing of vehicle data in order to what determine what zone based driver behavior rules should be presented to the driver. A data port on the back enables the accessory device to be logically coupled to the device (such as the devices of FIGS. 6 and 7) providing the processing. The accessory device does not need to include a wireless data link when used in connection with other devices having such functionality. The accessory display provides two basic functions (possibly three if equipped with audio). First, the accessory display provides zone based driver behavior rules to the driver in response to the vehicle arriving or approaching a location for which a remote user has defined a specific driver behavior. Second, the accessory display enables drivers to uniquely identify themselves using RFID cards (i.e., the accessory display includes an RFID card reader). If desired, the accessory display can include a speaker to provide audible feedback as well. Also if desired, the RFID component can be eliminated, however, it is desirable to provide some other mechanism to enable drivers to uniquely log into to the driver feedback system (perhaps using a keyboard, biometric device, or other input device in the vehicle.

Note than an icon of a hand holding a card is shown on the front of the accessory display. The icon provides the driver a visual reference of where the RFID driver card needs to be relative to the accessory display in order to be read.

Exemplary System Environment

FIG. 11 is a functional block diagram of an exemplary system employed to implement some of the concepts disclosed herein. The functional block diagram illustrates exemplary components used in each vehicle 128 that is enrolled in a zone based driver/vehicle behavior monitoring service, to implement some of the method steps discussed above. An exemplary zone based driver/vehicle behavior monitoring service is based on adding a memory 136 and a bi-directional data link 134 to each enrolled vehicle (in an exemplary, but not limiting embodiment, the data buffer and data link are combined into a single component). It should be understood that the memory (other than memory required for machine instructions for controller functionality) storage is not strictly required for embodiments where the zone based driver/vehicle behavior definitions (or at least the locations where such definitions apply, so a call to a remote server can be made to acquire such zone based driver/vehicle behavior definitions when the enrolled vehicle approaches the zone where such definitions apply). In an exemplary embodiment, the data link is a combination radio frequency (RF) transmitter and receiver, although separate transmitters and receivers could be used (note the term RF specifically encompasses cellular telephone based data links). A data terminal can optionally be included in the vehicle to facilitate operator entry of information and operator transmission of information that is presented to the operator on a display within the vehicle. While RF data transmission represents an exemplary embodiment, other types of data transmission could be employed. If the vehicle does not already include GPS (i.e. position) data collecting components 130, such components are added (noting that the collection of other types of data, particularly data than can show whether a driver has complied with zone based driver behavior rules is implemented in some embodiments). Most vehicles manufactured today include operational data collecting components already, as many of today's vehicles are designed to use such continuously generated operational data to control operation of the vehicle in real-time, and such vehicles generally include data collecting components, data buses, and controllers that use the operational data to control the operation of the vehicle. The vehicle includes at least one processor 132 that performs the function of managing the transmission of GPS data from the vehicle to the remote monitoring service (and driver compliance with zone based driver behavior rules). In some embodiments, such a processor may also be tasked with evaluating whether the vehicle's current position requires zone based driver/vehicle behavior definitions to be imposed. In general, processor 132 can be used to implement the vehicle side processor functions of the methods of claims 1 and 2, noting that multiple processors can be employed as well, such that not all functions are implemented by the same processor.

An output (not shown) responsive to data connection 138 is also included, to present zone based driver behavior definitions to the driver in a form that can be easily understood by the driver (generally the speaker or display. The output can be implemented using a speaker providing an audible output, and using a display providing a visual output. Note that the output can be combined into a single component with the memory, GPS collecting component, processor and the data link, so only a single additional component is added to the vehicle. In some embodiments, the output is a speaker system already installed in the vehicle, such as an OEM stereo system. In some embodiments, the display and or speakers are part of a smart phone or mobile computing device used by the driver in the vehicle (see element 144).

In a related preferred embodiment the processor, the GPS component, any buffer, and data link are combined into a single telematics device, and an additional display may be required (such as the accessory of FIG. 10). Such a device will send GPS and vehicle/driver data to the remote computing device discussed above at a plurality of different times during the course of the operation of the vehicle. In general, the telematics device will transmit data at intervals ranging from as frequently as every 5 to 15 seconds, or as rarely as every 5 minutes, recognizing that such intervals can vary, and are intended to be exemplary, and not limiting.

As indicated in FIG. 11, a remote computing device 140 (or network of devices operated by the monitoring service) is logically coupled via a network 142 (such as the Internet) to one or more computing devices 146 accessible to a vehicle operator (noting that in at least some embodiments, the monitoring service performs the monitoring function for a plurality of different vehicle operators/fleets). Also shown is an optional driver computing device 144 (such as a personal computer, a tablet, or a smart phone). In some embodiments, fleets operators may want to give drivers access to a webpage similar to that shown in FIG. 3, not to enable drivers to define zone based behaviors, but to let drivers review zone based behaviors for areas they are tasked with operating in. This will enable drivers to understand what zone based behaviors definitions they may encounter in their work day (noting only one such driver device is shown in the Figure; however, the monitoring service will likely be monitoring the performance of a plurality of drivers, each likely having access to a different computing device 144). Network 142 facilitates communication between computing devices 140, 144, and 146, enabling the monitoring service to efficiently communicate with drivers and vehicle operators. It should be noted that the concepts disclosed herein encompass embodiments where the monitoring service and vehicle operator are the same entity.

The concepts disclosed herein are in at least some embodiments intended to be used by fleet owners operating multiple vehicles, and the GPS data conveyed to the remote location for monitoring will include an ID component that enables each enrolled vehicle to be uniquely identified.

Exemplary Computing Environment

FIG. 12 is a functional block diagram of an exemplary computing device that can be employed to implement some of the method steps disclosed herein. It should be understood that the concepts disclosed herein encompass processing of data collected at a vehicle both in the vehicle and at a remote computing device.

FIG. 12 schematically illustrates an exemplary computing system 250 suitable for use in implementing the processing functions disclosed herein. Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of GPS data (and in some embodiments, of driver behavior data) collected from enrolled vehicles, to identify when a vehicle is approaching a zone for which a user has defined a zone based driver/vehicle definition. The machine instructions implement functions generally consistent with those described above. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to monitor vehicle position data to determine if a zone based behavior definition applies, or to enable a user to define a zone based behavior definition). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. In embodiments where computing system 250 is implemented in a vehicle, the computing system 250 can be configured to run autonomously, such that a user input device not regularly employed.

Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. In embodiments where computing system 250 is implemented in a vehicle, the computing system 250 can be vehicle performance data (and position data when desired) collected in connection with operation of enrolled vehicles to configured to run autonomously, such that a user output device not regularly employed (for embodiments where no zone based driver behavior is enabled, but zone based vehicle behavior is enabled).

Data link 264 is configured to enable data to be input into computing system 250 for processing. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

FIGS. 13A and 13B provide details of an exemplary technique to generate a top gear metric, to be used in an informational display, or for the purpose of advising a user to shift to a higher gear. The top gear metric is generated using data collected from the vehicle and an understanding of the vehicle's design characteristics. The top gear calculation requires data to be collected from the vehicle, and for specific transmission information to be known about the vehicle. Data collected from the vehicle is sent to a remote server (over the "cloud") and a top gear efficiency analysis is performed and used as the basis of a driver advisory. The top gear analysis is based on obtaining RPM, speed, odometer and location data from the vehicle during vehicle operation. That data, in connection with known gear ratio data for the specific transmission in that vehicle, is used to generate the driver advisory, or a report of gear use efficiency, over time, generally using the process shown in FIG. 13B. Skilled persons will readily recognize that these techniques can be applied to evaluating compliance of driver behavior to zone based mandated behavior.

Note that location data from the enrolled vehicles will be communicated wirelessly in at least some embodiments, to the remote computing system that analyzes the data to evaluate if the vehicle is approaching or at a location where a zone based behavior definition applies.

It should be understood that the terms "remote computer", "computing device", and "remote computing device" are intended to encompass a single computer as well as networked computers, including servers and clients, in private networks or as part of the Internet. The location data and driver compliance data (compliance with zone based driver behavior rules) received by the monitoring service from the vehicle can be stored by one element in such a network, retrieved for review by another element in the network, and analyzed by yet another element in the network. While implementation of the methods noted above have been discussed in terms of execution of machine instructions by a processor (i.e., the computing device implementing machine instructions to implement the specific functions noted above), the methods could also be implemented using a custom circuit (such as an application specific integrated circuit or ASIC).

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for advising a driver of a fleet vehicle to adopt a behavior based on a location of the fleet vehicle, comprising the steps of:
   (a) providing a remote user with a computing device displaying a graphical user interface, including a map and a data entry window, thereby enabling the remote user to define a zone on the map and to enter a message in the data entry window regarding zone-based behavior at that zone;
   (b) automatically collecting vehicle location data during operation of the fleet vehicle, the fleet vehicle at every moment being at a current location;
   (c) automatically analyzing current fleet vehicle location data to determine if the fleet vehicle is within the zone; and
   (d) when the fleet vehicle is within the zone, automatically using at least one of a display and an audible announcement to convey to the driver message regarding zone-based behavior.

2. The method of claim 1, wherein the step of automatically analyzing the current location of the fleet vehicle is implemented by a processor remote from the fleet vehicle, and further comprising the steps of:
   (a) automatically conveying the fleet vehicle location data collected during operation of the fleet vehicle from the fleet vehicle to the remote processor; and
   (b) when the fleet vehicle is within the zone, automatically conveying the zone-based behavior defined for that location from the remote processor to the fleet vehicle.

3. The method of claim 1, wherein the step of automatically analyzing the current location of the fleet vehicle is implemented by a processor at the fleet vehicle, and further comprising the step of automatically conveying to the fleet vehicle from the remote user the zone and the zone-based behavior, with which to advise the driver.

4. The method of claim 1, wherein the step of automatically analyzing the current location of the fleet vehicle is implemented by a processor at the fleet vehicle, and further comprising the steps of:
   (a) automatically conveying the location for which the zone-based behavior has been defined from a controller remote from the fleet vehicle to a controller at the fleet vehicle;
   (b) when the controller at the fleet vehicle determines that the current vehicle location is within the predetermined distance of the location, automatically conveying from the controller at the fleet vehicle to the remote controller a request for the zone-based behavior defined for that location to the fleet vehicle, such that step (d) of claim 1 can be implemented.

5. The method of claim 1, wherein the remote user enters a message stating that the zone-based behavior corresponds to requiring that vehicle lighting must be in specific state while the fleet vehicle is in the zone.

6. The method of claim 1, wherein the remote user enters a message stating that the zone-based behavior corresponds to requiring no engine idling in the zone.

7. The method of claim 1, wherein the remote user enters a message stating that the zone-based behavior corresponds to imposing a special speed limit in the zone.

8. The method of claim 1, wherein the remote user enters a message stating that the zone-based behavior corresponds to forbidding the use of power take off devices in the zone.

9. The method of claim 1, wherein the remote user sets the zone to correspond to at least one of a warehouse, a tank farm, and a port.

10. The method of claim 1, wherein the remote user is enabled to define a zone on the map by being enabled to draw a zone on the map.

11. The method of claim 1, wherein the remote user is enabled to define a zone on the map by being enabled to select a predefined area on the map.

12. The method of claim 11, wherein the remote user is enabled to select a facility shown on the map.

13. The method of claim 1, wherein the remote user is enabled to select a driver behavior from a displayed list of behaviors.

14. A system for setting required driver behavior for specific locations and for matching a driver behavior to current vehicle location; the system comprising:
   (a) a remote computing device displaying a graphical user interface, including a map and a data entry window, thereby enabling a remote user to define a zone on the map and to enter a message in the data entry window regarding zone-based behavior at that zone
   (b) a display for communicating zone-based driver behavior rules to the driver relating to some aspect of vehicle operation; and
   (c) a vehicle position determining component, producing vehicle location data;
   (d) a memory for storing zone-based driver behavior rules;
   (e) at least one processor, the at least one processor being configured to implement the functions of:
      (i) analyzing the vehicle location data and the zone-based driver behavior rules to determine if a current vehicle location falls within the zone defined by the remote user; and
      (ii) if the analysis so indicates, automatically conveying to the display the zone-based driver behavior rules, thereby displaying the rules to the driver.

15. The system of claim 14, wherein the at least one processor includes a processor remote from the vehicle and wherein the remote processor implements the functions of analyzing the vehicle location and the zone-based driver behavior rules to determine if a current vehicle location corresponds to the location defined in the zone based driver rules, and wherein the system further comprises:

(a) a telematics unit at the vehicle that automatically conveys the vehicle location data collected during operation of the vehicle from the vehicle to the remote processor;

(b) a telematics unit at the remote processor that, when the vehicle is within the zone, automatically conveys the zone-based behavior defined for that location from the remote processor to the vehicle.

16. The system of claim 14, wherein the at least one processor includes a processor at the vehicle, and wherein the system further includes telematics units that convey to the vehicle from the remote user the zone and the zone-based behavior.

17. The system of claim 14, wherein the zone-based behavior corresponds to requiring that vehicle lighting must be in specific state while the vehicle is in the zone.

18. The system of claim 14, wherein the zone-based behavior corresponds to imposing a special speed limit in the zone.

19. The method of claim 14, wherein the zone-based behavior corresponds to forbidding the use of power take off devices in the zone.

20. The system of claim 14, wherein the zone corresponds to at least one of a warehouse, a tank farm, and a port.

* * * * *